US012779945B2

(12) United States Patent
Nomura et al.

(10) Patent No.: US 12,779,945 B2
(45) Date of Patent: Nov. 3, 2026

(54) HEAT PUMP CYCLE APPARATUS

(71) Applicant: DENSO CORPORATION, Kariya-city (JP)

(72) Inventors: Tomoyuki Nomura, Kariya-city (JP); Yuichi Kami, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 132 days.

(21) Appl. No.: 18/986,615

(22) Filed: Dec. 18, 2024

(65) Prior Publication Data

US 2025/0115094 A1 Apr. 10, 2025

Related U.S. Application Data

(63) Continuation of application No. PCT/JP2023/021883, filed on Jun. 13, 2023.

(30) Foreign Application Priority Data

Jun. 24, 2022 (JP) ................................ 2022-101833

(51) Int. Cl.
*B60H 1/00* (2006.01)

(52) U.S. Cl.
CPC .................... *B60H 1/00921* (2013.01); *B60H 2001/00949* (2013.01); *B60H 2001/00961* (2019.05)

(58) Field of Classification Search
CPC ...................................................... F25B 47/02
See application file for complete search history.

(56) References Cited

U.S. PATENT DOCUMENTS

2022/0275982 A1 9/2022 Mieda et al.
2022/0402331 A1 12/2022 Tada et al.

FOREIGN PATENT DOCUMENTS

JP 2015033953 A 2/2015
JP 2021133795 A 9/2021
JP 2021156567 A 10/2021
WO WO-2021100409 A1 * 5/2021 ............. F25B 40/02

OTHER PUBLICATIONS

WO-2021100409-A1 translation.*

* cited by examiner

*Primary Examiner* — Elizabeth J Martin
(74) *Attorney, Agent, or Firm* — Harness, Dickey & Pierce, P.L.C.

(57) ABSTRACT

A heat pump cycle apparatus includes a compressor, an upstream branch part, a heating unit, an outside air heat exchanger, an upstream decompression unit, a downstream decompression unit, a bypass passage, and a bypass-side flow rate adjusting unit. In a heating mode of heating a heating target, a refrigerant decompressed in the upstream decompression unit flows into the outside air heat exchanger, and the refrigerant is caused to absorb heat of outside air in the outside air heat exchanger. In a defrosting mode of removing frost on the outside air heat exchanger, one refrigerant branched at the upstream branch part is caused to flow into the outside air heat exchanger to dissipate heat, and the refrigerant decompressed at the downstream decompression unit and the refrigerant flowing out of the bypass-side flow rate adjusting unit are mixed and sucked into the compressor.

7 Claims, 9 Drawing Sheets

ENDOTHERMIC HOT GAS DEFROSTING MODE

ENDOTHERMIC DEFROSTING MODE

ENDOTHERMIC HOT GAS DEFROSTING MODE

SOLE ENDOTHERMIC HOT GAS DEFROSTING MODE

HEATING ENDOTHERMIC HOT GAS DEFROSTING MODE

HOT GAS DEFROSTING MODE

SOLE HOT GAS DEFROSTING MODE

HEATING HOT GAS DEFROSTING MODE

HEAT PUMP CYCLE APPARATUS

CROSS REFERENCE TO RELATED APPLICATION

The present application is a continuation application of International Patent Application No. PCT/JP2023/021883 filed on Jun. 13, 2023, which designated the U.S. and claims the benefit of priority from Japanese Patent Application No. 2022-101833 filed on Jun. 24, 2022. The entire disclosures of all of the above applications are incorporated herein by reference.

FIELD OF THE INVENTION

The present disclosure relates to a heat pump cycle apparatus capable of performing an operation in a defrosting mode in which frost adhering to an outside air heat exchanger is removed.

BACKGROUND

Conventionally, a heat pump cycle apparatus may be capable of performing an operation in a defrosting mode in which frost adhering to an outside air heat exchanger is removed, when frost is formed on the outside air heat exchanger that exchanges heat between a refrigerant and the outside air. The heat pump cycle apparatus causes high-temperature refrigerant discharged from a compressor to flow into an outside air heat exchanger to melt and remove frost adhering to the outside air heat exchanger, so as to perform a condensation heat defrosting.

SUMMARY

A heat pump cycle apparatus according to an aspect of the present disclosure includes a compressor, an upstream branch part, a heating unit, an outside air heat exchanger, an upstream decompression unit, a downstream decompression unit, a bypass passage, and a bypass-side flow rate adjusting unit.

The compressor is configured to compress and discharge a refrigerant. The upstream branch part is configured to branch a flow of the refrigerant discharged from the compressor. The heating unit heats a heating target using the refrigerant flowing out of one outflow port of the upstream branch part as a heat source. The outside air heat exchanger is configured to exchange heat between the refrigerant and outside air. The upstream decompression unit is configured to decompress the refrigerant flowing into the outside air heat exchanger. The downstream decompression unit is configured to decompress the refrigerant flowing out of the outside air heat exchanger. Through the bypass passage, the refrigerant flowing out of an another outflow port of the upstream branch part flows toward a suction port side of the compressor while bypassing the heating unit. The bypass-side flow rate adjusting unit is configured to adjust a flow rate of the refrigerant flowing through the bypass passage.

In a heating mode in which the heating target is heated by the heating unit, the refrigerant decompressed in the upstream decompression unit is caused to flow into the outside air heat exchanger and to absorb heat of the outside air in the outside air heat exchanger.

Furthermore, in a defrosting mode in which frost adhering to the outside air heat exchanger is removed, the refrigerant flowing out of the one outflow port of the upstream branch part is caused to flow into the outside air heat exchanger to dissipate heat, the refrigerant flowing out of the outside air heat exchanger is decompressed by the downstream decompression unit, and the refrigerant decompressed by the downstream decompression unit and the refrigerant flowing out of the bypass-side flow rate adjusting unit are mixed and sucked into the compressor.

Thus, even when frost is formed on the outside air heat exchanger during operation in the heating mode, defrosting of the outside air heat exchanger can be performed by executing an operation in the defrosting mode.

BRIEF DESCRIPTION OF DRAWINGS

The foregoing and other objects, features, and advantages of the present disclosure will become more apparent from the following detailed description with reference to the accompanying drawings. In the drawings.

DESCRIPTION OF EMBODIMENTS

Figure 1:
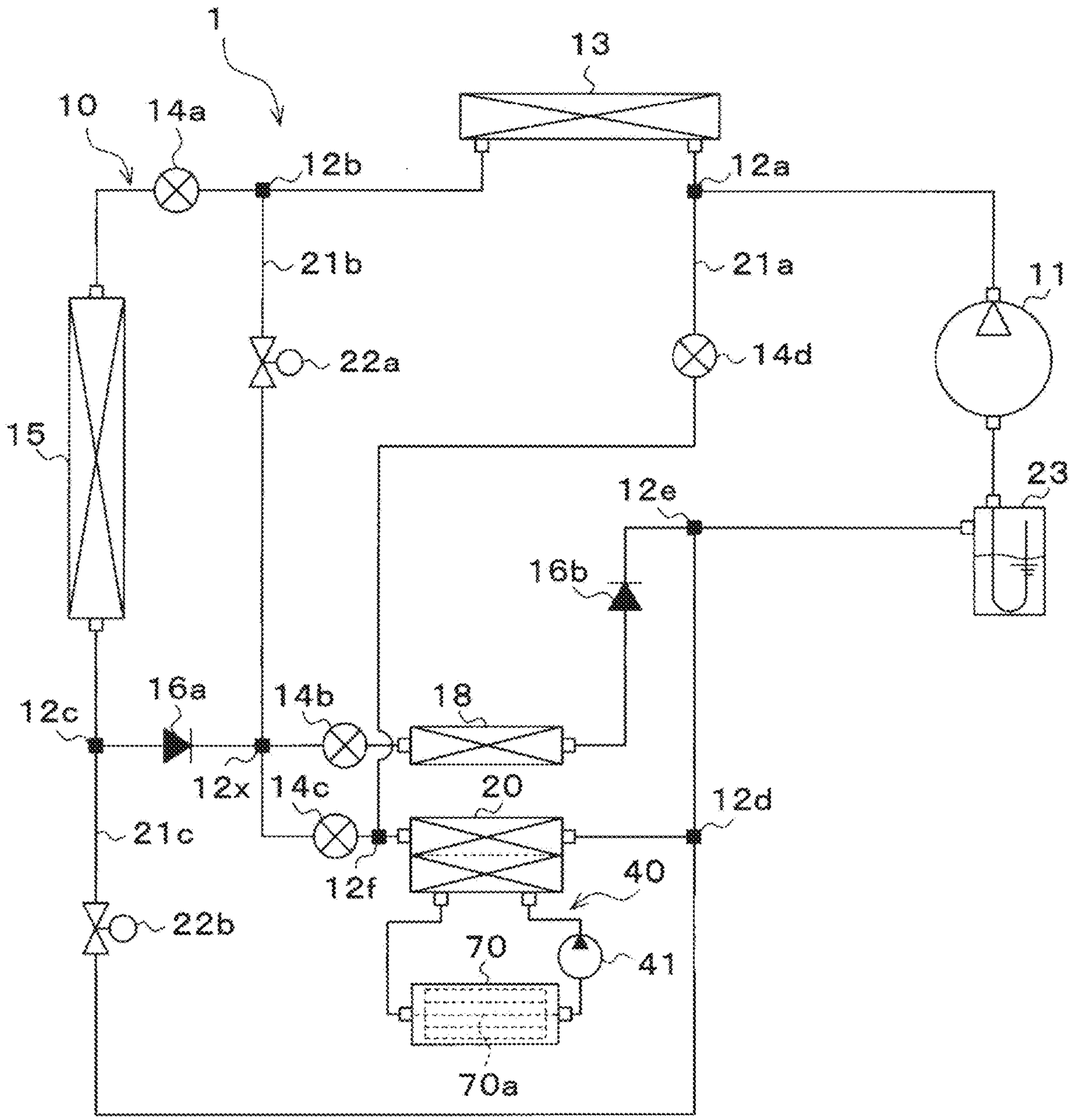
FIG. 1 is a schematic overall configuration diagram of a vehicle air conditioner of an embodiment.

In a heat pump cycle apparatus capable of performing an operation in a defrosting mode in which frost adhering to an outside air heat exchanger is removed, if the heat absorption source cannot generate sufficient defrosting heat, there is a possibility that the defrosting of the outside air heat exchanger cannot be completed quickly.

In view of the above, an object of the present disclosure is to provide a heat pump cycle apparatus capable of quickly completing defrosting of an outside air heat exchanger.

A heat pump cycle apparatus according to an aspect of the present disclosure includes a compressor, an upstream branch part, a heating unit, an outside air heat exchanger, an upstream decompression unit, a downstream decompression unit, a bypass passage, and a bypass-side flow rate adjusting unit.

The compressor is configured to compress and discharge a refrigerant. The upstream branch part is configured to branch a flow of the refrigerant discharged from the compressor. The heating unit heats a heating target using the refrigerant flowing out of one outflow port of the upstream branch part as a heat source. The outside air heat exchanger is configured to exchange heat between the refrigerant and outside air. The upstream decompression unit is configured to decompress the refrigerant flowing into the outside air heat exchanger. The downstream decompression unit is configured to decompress the refrigerant flowing out of the outside air heat exchanger. Through the bypass passage, the refrigerant flowing out of an another outflow port of the upstream branch part flows toward a suction port side of the compressor. The bypass-side flow rate adjusting unit is configured to adjust a flow rate of the refrigerant flowing through the bypass passage.

In a heating mode in which the heating target is heated by the heating unit, the refrigerant decompressed in the upstream decompression unit is caused to flow into the outside air heat exchanger and to absorb heat of the outside air in the outside air heat exchanger.

Furthermore, in a defrosting mode in which frost adhering to the outside air heat exchanger is removed, the refrigerant flowing out of the one outflow port of the upstream branch part is caused to flow into the outside air heat exchanger to dissipate heat, the refrigerant flowing out of the outside air heat exchanger is decompressed by the downstream decompression unit, and the refrigerant decompressed by the downstream decompression unit and the refrigerant flowing out of the bypass-side flow rate adjusting unit are mixed and sucked into the compressor.

Thus, even when frost is formed on the outside air heat exchanger during operation in the heating mode, defrosting of the outside air heat exchanger can be performed by executing an operation in the defrosting mode.

In the defrosting mode, the refrigerant decompressed in the downstream decompression unit and the refrigerant flowing out of the bypass-side flow rate adjusting unit are mixed and sucked into the compressor. That is, in the defrosting mode, the refrigerant having a relatively high enthalpy is mixed with the refrigerant decompressed in the downstream decompression unit to balance the cycle.

Thus, the refrigerant on an outlet side of the outside air heat exchanger can be a refrigerant having a relatively low enthalpy, and the amount of heat released from the refrigerant in the outside air heat exchanger can be increased. As a result, the amount of heat released from the refrigerant to the frost adhering to the outside air heat exchanger is increased, and the defrosting of the outside air heat exchanger can be quickly completed.

Hereinafter, embodiments of the present disclosure will be described with reference to the drawings. In the embodiments below, the same or equivalent parts will be denoted by the same reference characters.

An embodiment of a heat pump cycle apparatus according to the present disclosure will be described with reference to FIGS. 1 to 11. In the present embodiment, the heat pump cycle apparatus according to the present disclosure is applied to a vehicle air conditioner 1 mounted on an electric vehicle. An electric vehicle is a vehicle that obtains driving force for traveling from an electric motor. The vehicle air conditioner 1 performs air conditioning of a vehicle interior, which is a space to be air conditioned, and performs temperature adjustment of an in-vehicle device. Therefore, the vehicle air conditioner 1 can be referred to as an air conditioner with an in-vehicle device temperature adjustment function or an in-vehicle device temperature adjustment apparatus with an air conditioning function.

The vehicle air conditioner 1 specifically performs temperature adjustment of a battery 70 as the in-vehicle device. The battery 70 is a secondary battery that stores electric power supplied to a plurality of in-vehicle devices operated by electricity. The battery 70 is an assembled battery formed by electrically connecting a plurality of stacked battery cells in series or in parallel. The battery cell of the present embodiment is a lithium ion battery.

The battery 70 is a heat generating device that generates heat during operation (that is, at the time of charging and discharging). The battery 70 is likely to decrease in output at a low temperature, and is likely to deteriorate at a high temperature. Thus, the temperature of the battery 70 needs to be maintained within an appropriate temperature range (in the present embodiment, equal to or higher than 15° C. and equal to or lower than 55° C.). Therefore, in the electric vehicle of the present embodiment, temperature adjustment of the battery 70 is performed using the vehicle air conditioner 1.

In the vehicle air conditioner 1, when frost is formed on an outside air heat exchanger 15 of a heat pump cycle 10 described later, the heat generated by the battery 70 can be used as a heat source for melting and removing the frost adhering to the outside air heat exchanger 15. Therefore, the battery 70 serves as a heat absorption source that generates defrosting heat used for defrosting the outside air heat exchanger 15.

The vehicle air conditioner 1 is configured to be switchable between operation modes in order to perform air conditioning of the vehicle interior and temperature adjustment of the battery 70. The vehicle air conditioner 1 includes a heat pump cycle 10, a low-temperature side heat medium circuit 40, an interior air conditioning unit 50, a control device 60, and the like.

First, the heat pump cycle 10 will be described with reference to FIG. 1. The heat pump cycle 10 is a vapor compression refrigeration cycle that adjusts temperatures of ventilation air blown into the vehicle interior and a low-temperature side heat medium circulating in the low-temperature side heat medium circuit 40. The heat pump cycle 10 is configured to be capable of switching a circuit configuration of a refrigerant circuit according to an operation mode of the vehicle air conditioner 1 in order to perform air conditioning of the vehicle interior and temperature adjustment of the in-vehicle device.

In the heat pump cycle 10, an HFO refrigerant (specifically, R1234yf) is employed as the refrigerant. The heat pump cycle 10 constitutes a subcritical refrigeration cycle in which the pressure of a high-pressure side refrigerant does not exceed the critical pressure of the refrigerant. Refrigerating machine oil for lubricating a compressor 11 is mixed in the refrigerant. The refrigerating machine oil is a PAG oil having compatibility with a liquid-phase refrigerant. A part of the refrigerating machine oil circulates in the heat pump cycle 10 together with the refrigerant.

The compressor 11 sucks, compresses, and discharges the refrigerant in the heat pump cycle 10. The compressor 11 is an electric compressor in which a fixed capacity type compression mechanism having a fixed discharge capacity is rotationally driven by an electric motor. A rotation speed (that is, refrigerant discharge capacity) of the compressor 11 is controlled by a control signal output from the control device 60 described later.

The compressor 11 is disposed in a drive unit chamber formed on the front side of the vehicle interior. The drive unit chamber forms a space in which at least a part of devices (for example, an electric motor for traveling) or the like used for generating or adjusting a driving force for traveling of the vehicle is disposed.

An inflow port side of a first three-way joint 12*a* is connected to the discharge port of the compressor 11. The first three-way joint 12*a* has three inflow-outflow ports communicating with each other. As the first three-way joint 12*a*, a joint formed by joining a plurality of pipes or a joint formed by providing a plurality of refrigerant passages in a metal block or a resin block can be employed.

The heat pump cycle 10 further includes a second three-way joint 12*b* to a sixth three-way joint 12*f*. A basic configuration of the second three-way joint 12*b* to the sixth three-way joint 12*f* is similar to that of the first three-way joint 12*a*.

In these three-way joints, when one of the three inflow-outflow ports is used as an inflow port and the remaining two are used as an outflow port, the three-way joint serves as a branch part that branches the flow of the refrigerant. When two of the three inflow-outflow ports are used as inflow ports and the remaining one of the three inflow-outflow ports is used as an outflow port, the three-way joint serves as a merging part in which flows of the refrigerant are merged.

For example, the first three-way joint 12*a* serves as an upstream branch part that branches the flow of the refrigerant discharged from the compressor 11. The sixth three-way joint 12*f* serves as a bypass-side merging part that merges a flow of the refrigerant flowing out of a cool-down expansion valve 14*c* described later with a flow of the refrigerant flowing out of a bypass-side flow rate adjusting valve 14*d* described later.

A refrigerant inlet side of an interior condenser 13 is connected to one outflow port of the first three-way joint 12*a*. One inflow port side of the sixth three-way joint 12*f* is connected to another outflow port of the first three-way joint 12*a*. A refrigerant passage from the another outflow port of the first three-way joint 12*a* to the one inflow port of the sixth three-way joint 12*f* is a bypass passage 21*a*. The bypass-side flow rate adjusting valve 14*d* is disposed in the bypass passage 21*a*.

The bypass-side flow rate adjusting valve 14*d* is a bypass-side decompression unit that decompresses a refrigerant (that is, another refrigerant branched at the first three-way joint 12*a*) flowing out of the another outflow port of the first three-way joint 12*a* during a hot gas heating mode described later, or the like. The bypass-side flow rate adjusting valve 14*d* is a bypass-side flow rate adjusting unit that adjusts a mass flow rate of the refrigerant flowing through the bypass passage 21*a*.

The bypass-side flow rate adjusting valve 14*d* is an electric variable throttle mechanism including a valve body that changes a throttle opening degree and an electric actuator that moves the valve body. As the electric actuator, a stepping motor or a brushless motor can be employed. Operation of the bypass-side flow rate adjusting valve 14*d* is controlled by a control signal output from the control device 60.

The bypass-side flow rate adjusting valve 14*d* has a full-open function that functions as a simple refrigerant passage without exhibiting a refrigerant decompression function and a flow rate adjustment function by changing the valve opening degree to fully opened. The bypass-side flow rate adjusting valve 14*d* has a full close function of closing the refrigerant passage by changing the valve opening degree to fully closed.

As described later, the heat pump cycle 10 further includes a heating expansion valve 14*a*, a cooling expansion valve 14*b*, and a cool-down expansion valve 14*c*. Basic configurations of the heating expansion valve 14*a*, the cooling expansion valve 14*b*, and the cool-down expansion valve 14*c* are similar to those of the bypass-side flow rate adjusting valve 14*d*.

The heating expansion valve 14*a*, the cooling expansion valve 14*b*, the cool-down expansion valve 14*c*, and the bypass-side flow rate adjusting valve 14*d* can switch the refrigerant circuit by the full close function described above. Therefore, the heating expansion valve 14*a*, the cooling expansion valve 14*b*, the cool-down expansion valve 14*c*, and the bypass-side flow rate adjusting valve 14*d* serve as an operation mode switching unit that switches the operation mode by switching the refrigerant circuit.

Of course, the heating expansion valve 14*a*, the cooling expansion valve 14*b*, the cool-down expansion valve 14*c*, and the bypass-side flow rate adjusting valve 14*d* may be formed by combining a variable throttle mechanism that does not have a full close function and an on-off valve that opens and closes a throttle passage. In this case, each on-off valve serves as the operation mode switching unit.

The interior condenser 13 is disposed in an air conditioning case 51 of the interior air conditioning unit 50 described later. The interior condenser 13 is a heating heat exchange unit that exchanges heat between the refrigerant discharged from the one outflow port of the first three-way joint 12*a* (that is, one discharge refrigerant branched at the first three-way joint 12*a*) and ventilation air having passed through an interior evaporator 18 described later.

In the interior condenser 13, heat of the discharge refrigerant is radiated to the ventilation air to heat the ventilation air. Therefore, the interior condenser 13 is a heating unit that heats the ventilation air as a heating target using the one discharge refrigerant branched at the first three-way joint 12*a* as a heat source.

An inflow port side of the second three-way joint 12*b* is connected to a refrigerant outlet of the interior condenser 13. An inlet side of the heating expansion valve 14*a* is connected to one outflow port of the second three-way joint 12*b*. One inflow port side of the four-way joint 12*x* is connected to another outflow port of the second three-way joint 12*b*. A refrigerant passage from the another outflow port of the second three-way joint 12*b* to one inflow port of the four-way joint 12*x* is a high-pressure side passage 21*b*.

A high-pressure side on-off valve 22*a* is disposed in the high-pressure side passage 21*b*. The high-pressure side on-off valve 22*a* is an on-off valve that opens and closes the high-pressure side passage 21*b*. The high-pressure side on-off valve 22*a* is an electromagnetic valve whose opening/closing operation is controlled by a control voltage output from the control device 60. The high-pressure side on-off valve 22*a* can switch the refrigerant circuit by opening and closing the high-pressure side passage 21*b*. Therefore, the high-pressure side on-off valve 22*a* is an operation mode switching unit.

The four-way joint 12*x* is a joint having four inflow-outflow ports communicating with each other. As the four-way joint 12*x*, a joint formed similarly to the above-described three-way joint can be employed. As the four-way joint 12*x*, one formed by combining two three-way joints may be employed.

The heating expansion valve 14*a* is an upstream decompression unit that decompresses the refrigerant flowing into the outside air heat exchanger 15 during an outside air endothermic heating mode described later, or the like. Further, the heating expansion valve 14*a* is an upstream flow rate adjusting unit that adjusts a mass flow rate of the refrigerant flowing into the outside air heat exchanger 15.

A refrigerant inlet side of the outside air heat exchanger 15 is connected to an outlet of the heating expansion valve 14*a*. The outside air heat exchanger 15 is an outside air heat exchanger that exchanges heat between the refrigerant flowing out of the heating expansion valve 14*a* and outside air blown by an outside air fan (not illustrated). The outside air heat exchanger 15 is disposed on the front side in a drive unit chamber. Thus, during traveling of the vehicle, the traveling air flowing into the drive unit chamber through the grill can be applied to the outside air heat exchanger 15.

The outside air heat exchanger 15 serves as an outside air side heat dissipation unit that dissipates heat of the refrigerant to the outside air during a cooling mode described later, or the like. The outside air heat exchanger 15 serves as an outside air heat absorbing unit that causes the refrigerant to absorb heat of the outside air during the outside air endothermic heating mode or the like.

An inlet side of the third three-way joint 12*c* is connected to a refrigerant outlet of the outside air heat exchanger 15. Another inflow port side of the four-way joint 12*x* is connected to one outflow port of the third three-way joint 12*c* via a first check valve 16*a*. One inflow port side of the fourth three-way joint 12*d* is connected to another outflow port of the third three-way joint 12*c*. A refrigerant passage from the another outflow port of the third three-way joint 12*c* to the one inflow port of the fourth three-way joint 12*d* is a low-pressure side passage 21*c*.

A low-pressure side on-off valve 22*b* is disposed in the low-pressure side passage 21*c*. The low-pressure side on-off valve 22*b* is an on-off valve that opens and closes the low-pressure side passage 21*c*. A basic configuration of the low-pressure side on-off valve 22*b* is similar to that of the high-pressure side on-off valve 22*a*. The low-pressure side on-off valve 22*b* can switch the refrigerant circuit by opening and closing the low-pressure side passage 21*c*. Therefore, the low-pressure side on-off valve 22*b* is an operation mode switching unit.

The first check valve 16*a* allows the refrigerant to flow from the third three-way joint 12*c* toward the four-way joint 12*x*, and prohibits the refrigerant from flowing from the four-way joint 12*x* toward the third three-way joint 12*c*.

A refrigerant inlet side of the interior evaporator 18 is connected to one outflow port of the four-way joint 12*x* via a cooling expansion valve 14*b*. The cooling expansion valve 14*b* is an evaporator decompression unit that decompresses the refrigerant flowing out of the one outflow port of the four-way joint 12*x* during the cooling mode or the like. Further, the cooling expansion valve 14*b* is an evaporator flow rate adjusting unit that adjusts a mass flow rate of the refrigerant flowing into the interior evaporator 18.

The interior evaporator 18 is disposed in the air conditioning case 51 of the interior air conditioning unit 50. The interior evaporator 18 is a cooling heat exchange unit that exchanges heat between a low-pressure refrigerant decompressed by the cooling expansion valve 14*b* and ventilation air blown into the vehicle interior from an interior blower 52. The interior evaporator 18 cools down the ventilation air by evaporating the low-pressure refrigerant to exert a heat absorbing action.

A refrigerant outlet of the interior evaporator 18 is connected to one inflow port side of the fifth three-way joint 12*e* via a second check valve 16*b*. The second check valve 16*b* allows the refrigerant to flow from a refrigerant outlet side of the interior evaporator 18 toward the fifth three-way joint 12*e*, and prohibits the refrigerant from flowing from the fifth three-way joint 12*e* toward the refrigerant outlet side of the interior evaporator 18.

Another inflow port side of the sixth three-way joint 12*f* is connected to another outflow port of the four-way joint 12*x* via the cool-down expansion valve 14*c*. An inlet side of a refrigerant passage of a chiller 20 is connected to an outflow port of the sixth three-way joint 12*f*.

The cool-down expansion valve 14*c* is a chiller decompression unit that decompresses the refrigerant flowing into the chiller 20 during a cool-down and cooling mode described later, or the like. Further, the cool-down expansion valve 14*c* is a chiller flow rate adjusting unit that adjusts the mass flow rate of the refrigerant flowing into the chiller 20 during the cool-down and cooling mode or the like.

The cool-down expansion valve 14*c* serves as a downstream decompression unit that decompresses the refrigerant flowing out of the outside air heat exchanger 15 and flowing into the chiller 20 during a defrosting mode described later, or the like. Further, the cool-down expansion valve 14*c* serves as a downstream flow rate adjusting unit that adjusts the mass flow rate of the refrigerant flowing out of the outside air heat exchanger 15 and flowing into the chiller 20.

The chiller 20 is a cooling heat exchange unit that exchanges heat between the low-pressure refrigerant decompressed by the cool-down expansion valve 14*c* and the low-temperature side heat medium circulating in the low-temperature side heat medium circuit 40. The chiller 20 cools down the low-temperature side heat medium by evaporating the low-pressure refrigerant to exert a heat absorbing action. In the defrosting mode, the chiller 20 further serves as a defrosting heat absorbing unit that causes the low-pressure side refrigerant to absorb the defrosting heat generated by the battery 70 via the low-temperature side heat medium.

An outlet of the refrigerant passage of the chiller 20 is connected to another inflow port side of the fourth three-way joint 12*d*. Another inflow port side of the fifth three-way joint 12*e* is connected to an outflow port of the fourth three-way joint 12*d*.

An inlet side of an accumulator 23 is connected to an outflow port of the fifth three-way joint 12*e*. The accumulator 23 is a low-pressure gas-liquid separator disposed to separate the refrigerant having flowed into the accumulator into gas and liquid, cause the separated gas-phase refrigerant to flow out to a suction port side of the compressor 11, and store the separated liquid-phase refrigerant as a surplus refrigerant of the cycle. A gas-phase refrigerant outlet of the accumulator 23 is connected to the suction port side of the compressor 11.

Next, the low-temperature side heat medium circuit 40 will be described. The low-temperature side heat medium circuit 40 is a heat medium circuit that circulates the low-temperature side heat medium. In the present embodiment, an ethylene glycol aqueous solution is employed as the low-temperature side heat medium. A low-temperature side pump 41, a cooling water passage 70*a* of the battery 70, a heat medium passage of the chiller 20, and the like are connected to the low-temperature side heat medium circuit 40.

The low-temperature side pump 41 is a low-temperature side heat medium pressure feeding unit that pressure-feeds the low-temperature side heat medium flowing out from the cooling water passage 70*a* of the battery 70 to the inlet side of the heat medium passage of the chiller 20. The low-temperature side pump 41 is an electric pump whose rotation speed (that is, pressure feeding capability) is controlled by a control voltage output from the control device 60. An inlet side of the cooling water passage 70*a* of the battery 70 is connected to an outlet side of the heat medium passage of the chiller 20.

The cooling water passage 70*a* of the battery 70 is a cooling water passage formed to cool down the battery 70 by circulating the low-temperature side heat medium cooled down in the chiller 20. The cooling water passage 70*a* is formed inside a battery dedicated case that houses a plurality of stacked battery cells.

The passage configuration of the cooling water passage 70*a* is a passage configuration in which a plurality of passages is connected in parallel inside the battery dedicated case. Thus, all the battery cells can be uniformly cooled down in the cooling water passage 70*a*. A suction port side of the low-temperature side pump 41 is connected to an outlet of the cooling water passage 70*a*.

In the low-temperature side heat medium circuit 40, the amount of heat exchange between the refrigerant and the low-temperature side heat medium in the chiller 20 can be changed by changing the rotation speed of the low-temperature side pump 41.

Therefore, the low-temperature side pump 41 serves as an operation mode switching unit that switches the operation mode by changing the amount of heat exchange between the refrigerant and the low-temperature side heat medium in the chiller 20. More specifically, the low-temperature side pump 41 serves as an operation mode switching unit switches the operation mode by switching whether the chiller 20 performs heat exchange between the refrigerant and the low-temperature side heat medium.

Figure 2:
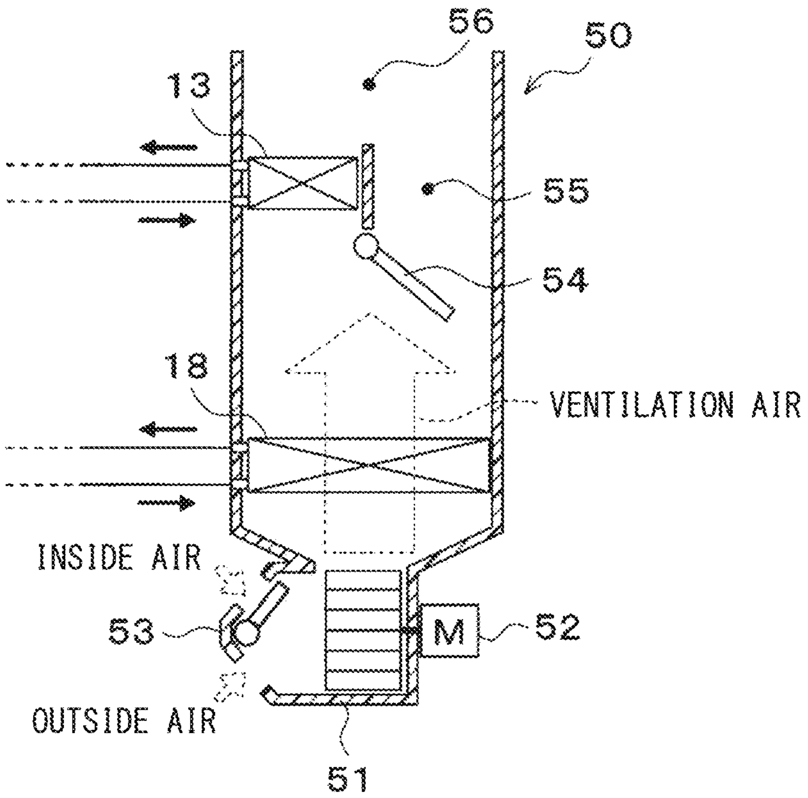
FIG. 2 is a schematic configuration diagram of an interior air conditioning unit of the embodiment.

Next, the interior air conditioning unit 50 will be described with reference to FIG. 2. The interior air conditioning unit 50 is a unit in which a plurality of constituent devices is integrated in order to blow ventilation air adjusted to an appropriate temperature for air conditioning in the vehicle interior to an appropriate position in the vehicle interior. The interior air conditioning unit 50 is disposed inside a dashboard panel (an instrument panel) at a foremost part of the vehicle interior.

The interior air conditioning unit 50 is formed by accommodating the interior blower 52, the interior evaporator 18, the interior condenser 13, and the like in the air conditioning case 51 forming an air passage for ventilation air. The air conditioning case 51 is formed by resin (for example, polypropylene) having a certain degree of elasticity and excellent strength.

An inside-outside air switching device 53 is disposed on the most upstream side of a ventilation air flow in the air conditioning case 51. The inside-outside air switching device 53 switches and introduces inside air (that is, vehicle interior air) and outside air (that is, vehicle exterior air) into the air conditioning case 51. Operation of the inside-outside air switching device 53 is controlled by a control signal output from the control device 60.

The interior blower 52 is disposed on a ventilation air flow downstream side of the inside-outside air switching device 53. The interior blower 52 is a blower that blows air sucked through the inside-outside air switching device 53 toward the vehicle interior. The rotation speed (that is, air blowing capacity) of the interior blower 52 is controlled by a control voltage output from the control device 60.

The interior evaporator 18 and the interior condenser 13 are disposed on a ventilation air flow downstream side of the interior blower 52. The interior evaporator 18 is disposed on a ventilation air flow upstream side of the interior condenser 13. In the air conditioning case 51, a cold air bypass passage 55 through which the ventilation air after passing through the interior evaporator 18 flows while bypassing the interior condenser 13 is formed.

An air mix door 54 is disposed on a ventilation air flow downstream side of the interior evaporator 18 in the air conditioning case 51 and on the ventilation air flow upstream side of the interior condenser 13 and the cold air bypass passage 55.

The air mix door 54 adjusts an air volume ratio between an air volume of the ventilation air passing through the interior condenser 13 side and an air volume of the ventilation air passing through the cold air bypass passage 55 in the ventilation air after passing through the interior evaporator 18. Operation of an actuator for driving the air mix door 54 is controlled by a control signal output from the control device 60.

Thus, in the interior air conditioning unit 50, the amount of heat exchange between the refrigerant and the ventilation air in the interior condenser 13 can be changed by changing the opening degree of the air mix door 54.

Therefore, the air mix door 54 serves as an operation mode switching unit that switches the operation mode by changing the amount of heat exchange between the refrigerant and the ventilation air in the interior condenser 13. More specifically, the air mix door 54 serves as an operation mode switching unit that switches the operation mode by switching whether to exchange heat between the refrigerant and the ventilation air in the interior condenser 13.

The mixing space 56 is disposed on a ventilation air flow downstream side of the interior condenser 13 and the cold air bypass passage 55. The mixing space 56 is a space for mixing the ventilation air heated at the interior condenser 13 with the ventilation air that has passed through the cold air bypass passage 55 and has not been heated.

Therefore, in the interior air conditioning unit 50, the temperature of the ventilation air (that is, the conditioned air) mixed in the mixing space 56 and blown into the vehicle interior can be adjusted by adjusting the opening degree of the air mix door 54.

A plurality of opening holes, which is not illustrated, for blowing conditioned air toward various positions in the vehicle interior is formed in a ventilation air flow most downstream portion of the air conditioning case 51. A blow-out mode door, which is not illustrated, that opens and closes each opening hole is disposed in each of the plurality of opening holes. Operation of the actuator for driving the blow-out mode door is controlled by a control signal output from the control device 60.

Therefore, in the interior air conditioning unit 50, the conditioned air adjusted to an appropriate temperature can be blown to an appropriate position in the vehicle interior by switching the opening hole where the blow-out mode door opens and closes.

Next, an electric control unit of the present embodiment will be described with reference to a block diagram of FIG. 3. The control device 60 includes a known microcomputer including a CPU, a ROM, a RAM, and the like, and peripheral circuits thereof. The control device 60 performs various calculations and processes on the basis of a control program stored in the ROM. The control device 60 controls the operation of various control target devices connected to the output side on the basis of the calculation and processing results.

A group of sensors for control such as an inside air temperature sensor 61*a*, an outside air temperature sensor 61*b*, a solar radiation sensor 61*c*, a discharge refrigerant temperature and pressure sensor 62*a*, a high-pressure side refrigerant temperature and pressure sensor 62*b*, an outside-air side refrigerant temperature and pressure sensor 62*c*, an evaporator-side refrigerant temperature and pressure sensor 62*d*, a chiller-side refrigerant temperature and pressure sensor 62*e*, a low-temperature side heat medium temperature sensor 63*b*, a battery temperature sensor 64, and a conditioned air temperature sensor 65 is connected to an input side of the control device 60.

The inside air temperature sensor 61*a* is an inside air temperature detection unit that detects a vehicle inside temperature (inside air temperature) Tr. The outside air temperature sensor 61*b* is an outside air temperature detection unit that detects a vehicle outside temperature (outside air temperature) Tam. The solar radiation sensor 61*c* is a solar radiation amount detection unit that detects a solar radiation amount As with which the vehicle interior is irradiated.

The discharge refrigerant temperature and pressure sensor 62*a* is a discharge refrigerant temperature and pressure detection unit that detects a discharge refrigerant temperature Td and a discharge refrigerant pressure Pd of the discharge refrigerant discharged from the compressor 11.

The high-pressure side refrigerant temperature and pressure sensor 62*b* is a high-pressure side refrigerant temperature and pressure detection unit that detects the high-pressure side refrigerant temperature T1 and the high-pressure side refrigerant pressure P1 of the refrigerant flowing out of the interior condenser 13.

The outside-air side refrigerant temperature and pressure sensor 62*c* is an outdoor device side refrigerant temperature and pressure detection unit that detects an outside air side refrigerant temperature T2 and an outside air side refrigerant pressure P2 of the refrigerant flowing out of the outside air heat exchanger 15.

The evaporator-side refrigerant temperature and pressure sensor 62*d* is an evaporator-side refrigerant temperature and pressure detection unit that detects an evaporator-side refrigerant temperature Te and an evaporator-side refrigerant pressure Pe of the refrigerant flowing out of the interior evaporator 18.

The chiller-side refrigerant temperature and pressure sensor 62*e* is a chiller-side refrigerant temperature and pressure detection unit that detects the chiller-side refrigerant temperature Tc and the chiller-side refrigerant pressure Pc of the refrigerant flowing out of the refrigerant passage of the chiller 20.

In the present embodiment, as a refrigerant temperature and pressure sensor, a detection unit in which the pressure detection unit and the temperature detection unit are integrated is employed, but of course, a pressure detection unit and a temperature detection unit configured separately may be employed.

The low-temperature side heat medium temperature sensor 63*b* is a low-temperature side heat medium temperature detection unit that detects a low-temperature side heat medium temperature TWL which is the temperature of the low-temperature side heat medium flowing into the heat medium passage of the chiller 20.

The battery temperature sensor 64 is a battery temperature detection unit that detects a battery temperature TB that is a temperature of the battery 70. The battery temperature sensor 64 includes a plurality of temperature sensors, and detects temperatures at a plurality of positions of the battery 70. Thus, the control device 60 can detect a temperature difference and a temperature distribution of each battery cell forming the battery 70. As the battery temperature TB, an average value of detection values of a plurality of temperature sensors is employed.

The conditioned air temperature sensor 65 is a conditioned air temperature detection unit that detects a ventilation air temperature TAV which is the temperature of the ventilation air blown into the vehicle interior from the mixing space 56.

Figure 3:
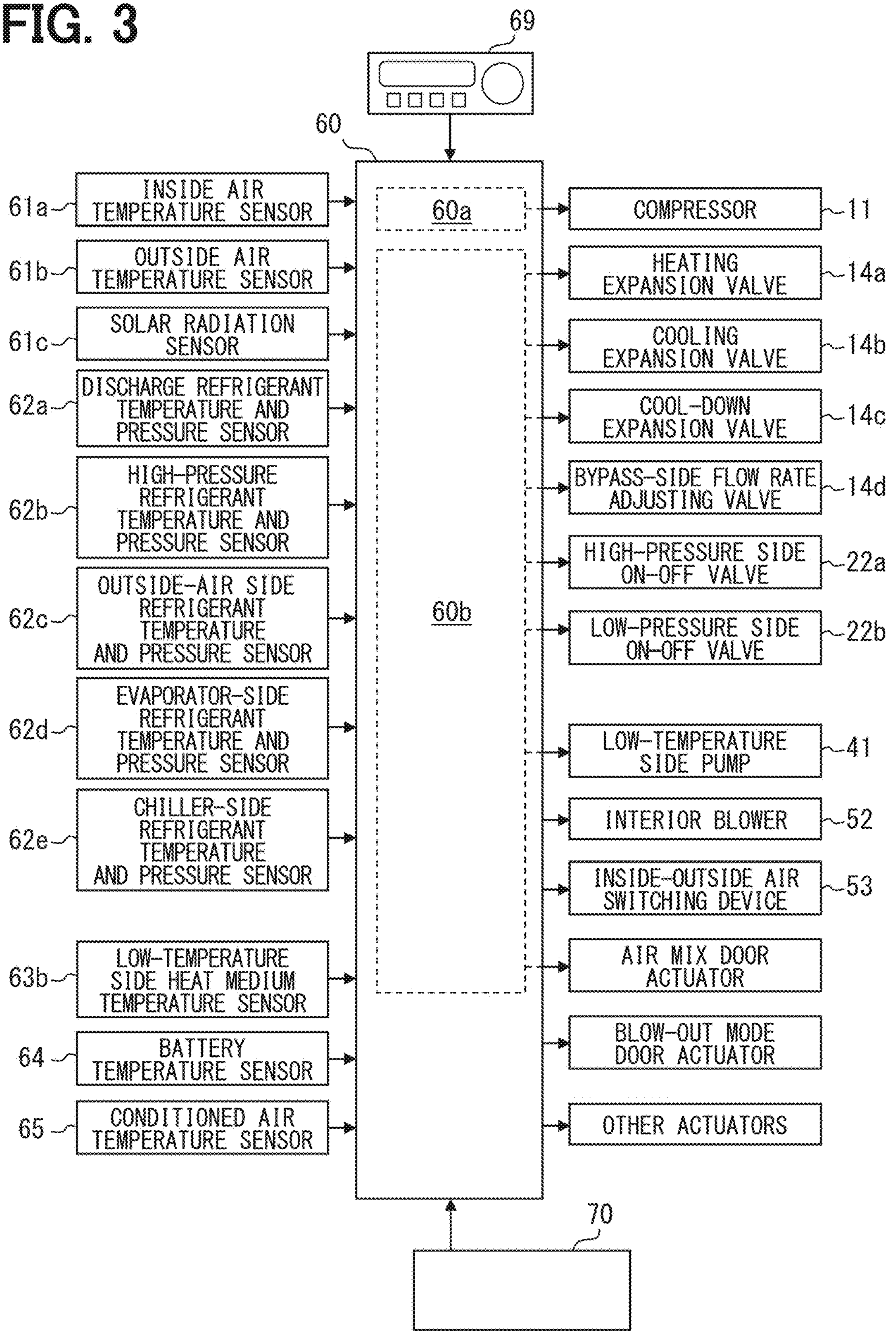
FIG. 3 is a block diagram illustrating an electric control unit of the vehicle air conditioner of the embodiment.

As illustrated in FIG. 3, an operation panel 69 disposed in the vicinity of the instrument panel at a front part of the vehicle interior is connected to the input side of the control device 60. The operation panel 69 is provided with various operation switches operated by an occupant. Operation signals from various operation switches are input to the control device 60.

Specific examples of the various operation switches provided on the operation panel 69 include an automatic switch, an air conditioner switch, a heating switch, an air volume setting switch, a temperature setting switch, and the like.

The automatic switch is an automatic control setting unit that sets or cancels automatic control operation of the vehicle air conditioner 1. The air conditioner switch is a cooling request unit that requests the interior evaporator 18 to cool down the ventilation air. The heating switch is a heating request unit that requests the interior condenser 13 to heat the ventilation air. The air volume setting switch is an air volume setting unit that manually sets an air blowing volume of the interior blower 52. The temperature setting switch is a temperature setting unit that sets a set temperature Tset in the vehicle interior.

Here, the control device 60 of the present embodiment is integrally configured with a control unit that controls various control target devices connected to an output side thereof. Therefore, a configuration (hardware and software) that controls the operation of each control target device constitutes a control unit that controls the operation of each control target device.

For example, in the control device 60, a configuration that controls the rotation speed of the compressor 11 constitutes a compressor control unit 60*a*. The configuration for controlling the operation of the operation mode switching unit constitutes the operation-mode control unit 60*b*.

Next, the operation of the vehicle air conditioner 1 of the present embodiment having the above configuration will be described. The vehicle air conditioner 1 switches various operation modes in order to perform air conditioning of the vehicle interior and temperature adjustment of the battery 70. Switching of the operation mode is performed by executing a control program stored in advance in the control device 60.

The control program is executed not only when a start switch (what is called ignition switch) of the vehicle system is turned on and the vehicle system is activated, but also during charging of the battery 70 from an external power supply, or the like.

In the control program, the detection signal of the control sensor group and the operation signal of the operation panel 69 described above are read. A target blowing temperature TAO, which is a target temperature of the ventilation air blown into the vehicle interior, is calculated on the basis of the read detection signal and operation signal. An operation mode is selected on the basis of the detection signal, the operation signal, the target blowing temperature TAO, and the like, and the operations of the various control target devices are controlled according to the selected operation mode.

Thereafter, until the end condition of the control program is satisfied, the control routine such as reading of the detection signal and the operation signal, calculation of the target blowing temperature TAO, selection of the operation mode, and control of various control target devices is repeated every predetermined control cycle.

The target blowing temperature TAO is calculated using the following Formula F1.

$$TAO = Kset \times Tset - Kr \times Tr - Kam \times Tam - Ks \times As + C \quad \text{(F1)}$$

Tset is a set temperature in the vehicle interior set by the temperature setting switch. Tr is the inside air temperature detected by the inside air temperature sensor 61*a*. Tam is the outside air temperature detected by the outside air temperature sensor 61*b*. As is the solar radiation amount detected by the solar radiation amount sensor 61*c*. Kset, Kr, Kam, and Ks are control gains, and C is a correction constant. Each operation mode will be described below.

(a) Cooling Mode

The cooling mode is an operation mode for cooling the vehicle interior by blowing the cooled-down ventilation air into the vehicle interior. The cooling mode is likely to be selected when the outside air temperature Tam is relatively high or when the target blowing temperature TAO is a relatively low value in a state where the automatic switch and the air conditioner switch are turned on.

The cooling mode includes a sole cooling mode in which the vehicle interior is cooled without cooling the battery 70, and a cool-down and cooling mode in which the battery 70 is cooled down and also the vehicle interior is cooled. In the control program of the present embodiment, an operation mode for cooling down the battery 70 is executed when the battery temperature TB detected by the battery temperature sensor 64 becomes equal to or higher than a predetermined reference upper limit temperature KTBH.

(a-1) Sole Cooling Mode

In the heat pump cycle 10 of the sole cooling mode, the control device 60 causes the heating expansion valve 14*a* to be in a fully open state, causes the cooling expansion valve 14*b* to be in a throttling state that exerts the refrigerant decompression function, causes the cool-down expansion valve 14*c* to be in a fully closed state, and causes the bypass-side flow rate adjusting valve 14*d* to be in a fully closed state. The control device 60 closes the high-pressure side on-off valve 22*a* and closes the low-pressure side on-off valve 22*b*.

Thus, in the heat pump cycle 10 of the sole cooling mode, the refrigerant circuit is switched so that the refrigerant discharged from the compressor 11 circulates through the interior condenser 13, the heating expansion valve 14*a* in the fully open state, the outside air heat exchanger 15, the cooling expansion valve 14*b* in the throttling state, the interior evaporator 18, the accumulator 23, and the suction port of the compressor 11 in this order.

In the interior air conditioning unit 50 in the sole cooling mode, the control device 60 controls the rotation speed of the interior blower 52 with reference to a control map stored in advance in the control device 60 on the basis of the target blowing temperature TAO.

The control device 60 adjusts the opening degree of the air mix door 54 so that the ventilation air temperature TAV detected by the conditioned air temperature sensor 65 approaches the target blowing temperature TAO. Further, the control device 60 appropriately controls the operation of other control target devices.

Therefore, in the heat pump cycle 10 of the sole cooling mode, a vapor compression refrigeration cycle is configured in which the interior condenser 13 and the outside air heat exchanger 15 function as a condenser that radiates heat from the refrigerant and condenses the refrigerant, and the interior evaporator 18 functions as an evaporator that evaporates the refrigerant. In the operation mode in which the interior evaporator 18 evaporates the refrigerant, the refrigerant evaporating temperature at the interior evaporator 18 is adjusted within a range in which frosting at the interior evaporator 18 can be suppressed.

In the interior air conditioning unit 50 in the sole cooling mode, the ventilation air blown from the interior blower 52 is cooled down by the interior evaporator 18. The ventilation air cooled down at the interior evaporator 18 exchanges heat with the refrigerant at the interior condenser 13 and is reheated according to the opening degree of the air mix door 54. The ventilation air whose temperature has been adjusted so as to approach the target blowing temperature TAO is blown into the vehicle interior, thereby implementing to cooling of the vehicle interior.

(a-2) Cool-Down and Cooling Mode

In the heat pump cycle 10 of the cool-down and cooling mode, the control device 60 causes the cool-down expansion valve 14*c* to be in the throttling state with respect to the sole cooling mode.

Thus, in the heat pump cycle 10 of the cool-down and cooling mode, the refrigerant discharged from the compressor 11 circulates as in the sole cooling mode. At the same time, the refrigerant circuit is switched such that the refrigerant discharged from the compressor 11 circulates through the interior condenser 13, the heating expansion valve 14*a* in the fully open state, the outside air heat exchanger 15, the cool-down expansion valve 14*c* in the throttling state, the chiller 20, the accumulator 23, and the suction port of the compressor 11 in this order. That is, the interior evaporator 18 and the chiller 20 are switched to the refrigerant circuit connected in parallel to the refrigerant flow.

In the low-temperature side heat medium circuit 40 in the cool-down and cooling mode, the control device 60 operates the low-temperature side pump 41 so as to exhibit a predetermined reference pressure feeding capability. Thus, in the low-temperature side heat medium circuit 40 in the cool-down and cooling mode, the low-temperature side heat medium pressure-fed from the low-temperature side pump 41 circulates through the heat medium passage of the chiller 20, the cooling water passage 70*a* of the battery 70, and the suction port of the low-temperature side pump 41 in this order.

In the interior air conditioning unit 50 in the cool-down and cooling mode, as in the sole cooling mode, the control device 60 controls the rotation speed of the interior blower 52, the opening degree of the air mix door 54, and the like. Further, the control device 60 appropriately controls the operation of other control target devices.

Therefore, in the heat pump cycle 10 of the cool-down and cooling mode, a vapor compression refrigeration cycle is configured in which the interior condenser 13 and the outside air heat exchanger 15 function as condensers and the interior evaporator 18 and the chiller 20 function as evaporators.

In the low-temperature side heat medium circuit 40 in the cool-down and cooling mode, the low-temperature side heat medium flowing into the heat medium passage of the chiller 20 exchanges heat with the low-pressure side refrigerant decompressed by the cool-down expansion valve 14*c* and is cooled down. The low-temperature side heat medium cooled down in the chiller 20 flows into the cooling water passage 70*a* of the battery 70.

The low-temperature side heat medium flowing into the cooling water passage 70*a* of the battery 70 absorbs the heat generated by the battery 70. Thus, the battery 70 is cooled down. The low-temperature side heat medium flowing out of the cooling water passage 70*a* of the battery 70 is sucked into the low-temperature side pump 41 and pressure-fed to the heat medium passage of the chiller 20.

In the interior air conditioning unit 50 in the cool-down and cooling mode, the ventilation air whose temperature has been adjusted is blown into the vehicle interior, thereby implementing cooling of the vehicle interior, as in the sole cooling mode.

(b) Dehumidifying Heating Mode

The dehumidifying heating mode is an operation mode in which the vehicle interior is dehumidified and heated by reheating cooled-down and dehumidified ventilation air and blowing the reheated air into the vehicle interior. The dehumidifying heating mode is likely to be selected when the outside air temperature Tam is in the intermediate temperature range or when the target blowing temperature TAO is in the intermediate temperature range in a state where the automatic switch and the air conditioner switch are turned on.

The dehumidifying heating mode includes a sole dehumidifying heating mode in which the vehicle interior is dehumidified and heated without cooling down the battery 70, and a cool-down dehumidifying heating mode in which the battery 70 is cooled down and also the vehicle interior is dehumidified and heated.

(b-1) Sole Dehumidifying Heating Mode

In the heat pump cycle 10 of the sole dehumidifying heating mode, the control device 60 causes the heating expansion valve 14*a* to be in the throttling state, causes the cooling expansion valve 14*b* to be in the throttling state, causes the cool-down expansion valve 14*c* to be in the fully closed state, and causes the bypass-side flow rate adjusting valve 14*d* to be in the fully closed state. The control device 60 closes the high-pressure side on-off valve 22*a* and closes the low-pressure side on-off valve 22*b*.

Thus, in the heat pump cycle 10 of the sole dehumidifying heating mode, the refrigerant circuit is switched such that the refrigerant discharged from the compressor 11 circulates through the interior condenser 13, the heating expansion valve 14*a* in the throttling state, the outside air heat exchanger 15, the cooling expansion valve 14*b* in the throttling state, the interior evaporator 18, the accumulator 23, and the suction port of the compressor 11 in this order.

In the interior air conditioning unit 50 in the sole dehumidifying heating mode, the control device 60 controls the rotation speed of the interior blower 52, the opening degree of the air mix door 54, and the like as in the sole cooling mode. Further, the control device 60 appropriately controls the operation of other control target devices.

Therefore, in the heat pump cycle 10 of the sole dehumidifying heating mode, a vapor compression refrigeration cycle is configured in which the interior condenser 13 functions as a condenser and the interior evaporator 18 functions as an evaporator.

In the sole dehumidifying heating mode, when the saturation temperature of the refrigerant in the outside air heat exchanger 15 is higher than the outside air temperature Tam, the outside air heat exchanger 15 functions as a condenser. When the saturation temperature of the refrigerant in the outside air heat exchanger 15 is lower than the outside air temperature Tam, the outside air heat exchanger 15 functions as an evaporator.

In the interior air conditioning unit 50 in the sole dehumidifying heating mode, the ventilation air from the interior blower 52 is cooled down and dehumidified by the interior evaporator 18. The ventilation air cooled down and dehumidified in the interior evaporator 18 is reheated in the interior condenser 13 in accordance with the opening degree of the air mix door 54. The ventilation air whose temperature has been adjusted so as to approach the target blowing temperature TAO is blown into the vehicle interior, thereby implementing dehumidification and heating of the vehicle interior.

(b-2) Cool-Down Dehumidifying Heating Mode

In the heat pump cycle 10 of the cool-down dehumidifying heating mode, the control device 60 causes the cool-down expansion valve 14*c* to be in a throttling state with respect to the sole dehumidifying heating mode.

Thus, in the heat pump cycle 10 of the cool-down dehumidifying heating mode, the refrigerant discharged from the compressor 11 circulates as in the sole dehumidifying heating mode. At the same time, the refrigerant circuit is switched such that the refrigerant discharged from the compressor 11 circulates through the interior condenser 13, the heating expansion valve 14*a* in the throttling state, the outside air heat exchanger 15, the cool-down expansion valve 14*c* in the throttling state, the chiller 20, the accumulator 23, and the suction port of the compressor 11 in this order. That is, the interior evaporator 18 and the chiller 20 are switched to the refrigerant circuit connected in parallel to the refrigerant flow.

In the low-temperature side heat medium circuit 40 in the cool-down dehumidifying heating mode, as in the cool-down and cooling mode, the control device 60 operates the low-temperature side pump 41. Thus, in the low-temperature side heat medium circuit 40 in the cool-down dehumidifying heating mode, the low-temperature side heat medium pressure-fed from the low-temperature side pump 41 circulates as in the cool-down and cooling mode.

In the interior air conditioning unit 50 in the cool-down dehumidifying heating mode, the control device 60 controls the rotation speed of the interior blower 52, the opening degree of the air mix door 54, and the like, as in the sole cooling mode. Further, the control device 60 appropriately controls the operation of other control target devices.

Therefore, in the heat pump cycle 10 of the cool-down dehumidifying heating mode, as in the sole dehumidifying heating mode, a vapor compression refrigeration cycle is configured in which the interior condenser 13 functions as a condenser and the interior evaporator 18 and the chiller 20 function as an evaporator.

In the cool-down dehumidifying heating mode, as in the sole dehumidifying heating mode, when the saturation temperature of the refrigerant in the outside air heat exchanger 15 is higher than the outside air temperature Tam, the outside air heat exchanger 15 functions as a condenser. When the saturation temperature of the refrigerant in the outside air heat exchanger 15 is lower than the outside air temperature Tam, the outside air heat exchanger 15 functions as an evaporator.

In the low-temperature side heat medium circuit 40 in the cool-down dehumidifying heating mode, as in the cool-down and cooling mode, the low-temperature side heat medium cooled down in the chiller 20 flows into the cooling water passage 70*a* of the battery 70. Thus, the battery 70 is cooled down.

In the interior air conditioning unit 50 in the cool-down dehumidifying heating mode, as in the sole dehumidifying heating mode, the ventilation air whose temperature has been adjusted is blown into the vehicle interior, thereby implementing dehumidifying and heating of the vehicle interior.

(c) Outside Air Endothermic Heating Mode

The outside air endothermic heating mode is an operation mode for heating the vehicle interior by blowing heated ventilation air into the vehicle interior. The outside air endothermic heating mode is likely to be selected when the outside air temperature Tam is relatively low or when the target blowing temperature TAO is relatively high in a state where the automatic switch is turned on. The heating switch is further selected when the heating switch of the operation panel is turned on.

In the outside air endothermic heating mode, the refrigerant decompressed by the heating expansion valve 14*a* flows into the outside air heat exchanger 15, and the refrigerant absorbs heat of the outside air in the outside air heat exchanger 15. The ventilation air is heated by the heating unit using the heat absorbed by the refrigerant from the outside air as a heat source. Therefore, the outside air endothermic heating mode is a heating mode of heating the heating target.

The outside air endothermic heating mode includes a sole outside air endothermic heating mode for heating the vehicle interior without cooling the battery 70, and a cool-down outside air endothermic heating mode for cooling down the battery 70 and heating the vehicle interior.

(c-1) Sole Outside Air Endothermic Heating Mode

In the heat pump cycle 10 of the sole outside air endothermic heating mode, the control device 60 causes the heating expansion valve 14*a* to be in the throttling state, causes the cooling expansion valve 14*b* to be in the fully closed state, causes the cool-down expansion valve 14*c* to be in the fully closed state, and causes the bypass-side flow rate adjusting valve 14*d* to be in the fully closed state. The control device 60 closes the high-pressure side on-off valve 22*a* and opens the low-pressure side on-off valve 22*b*.

Thus, in the heat pump cycle 10 of the sole outside air endothermic heating mode, the refrigerant circuit is switched such that the refrigerant discharged from the compressor 11 circulates through the interior condenser 13, the heating expansion valve 14*a* in the throttling state, the outside air heat exchanger 15, the low-pressure side passage 21*c*, the accumulator 23, and the suction port of the compressor 11 in this order.

The control device 60 controls the rotation speed of the compressor 11 so that the discharge refrigerant pressure Pd detected by the discharge refrigerant temperature and pressure sensor 62*a* approaches a heating target pressure PDO. The heating target pressure PDO is set so that the ventilation air can be appropriately heated in the interior condenser 13.

The control device 60 adjusts the throttle opening of the cool-down expansion valve 14*c* so that a subcooling degree SC1 of the refrigerant flowing out of the interior condenser 13 approaches a target subcooling degree SCO. The subcooling degree SC1 can be obtained from the high-pressure side refrigerant temperature T1 and the high-pressure side refrigerant pressure P1 detected by the high-pressure side refrigerant temperature and pressure sensor 62*b*. The target subcooling degree SCO is determined so that the coefficient of performance (COP) of the cycle approaches the maximum value.

In the interior air conditioning unit 50 in the sole outside air endothermic heating mode, the control device 60 controls the rotation speed of the interior blower 52, the opening degree of the air mix door 54, and the like as in the sole cooling mode. Further, the control device 60 appropriately controls the operation of other control target devices.

Therefore, in the heat pump cycle 10 of the sole outside air endothermic heating mode, a vapor compression refrigeration cycle is configured in which the interior condenser 13 functions as a condenser and the outside air heat exchanger 15 functions as an evaporator. In the outside air endothermic heating mode, the refrigerant needs to absorb heat of the outside air in the outside air heat exchanger 15. Thus, the refrigerant evaporating temperature at the outside air heat exchanger 15 during the outside air endothermic heating mode is lower than the outside air temperature Tam.

In the interior air conditioning unit 50 in the sole outside air endothermic heating mode, the ventilation air blown from the interior blower 52 passes through the interior evaporator 18. The ventilation air having passed through the interior evaporator 18 is heated at the interior condenser 13 in accordance with the opening degree of the air mix door 54. The ventilation air whose temperature has been adjusted so as to approach the target blowing temperature TAO is blown into the vehicle interior, thereby implementing heating of the vehicle interior.

(c-2) Cool-Down Outside Air Endothermic Heating Mode

In the heat pump cycle 10 of the cool-down outside air endothermic heating mode, the control device 60 causes the cool-down expansion valve 14*c* to be in a throttling state with respect to the sole outside air endothermic heating mode. The control device 60 opens the high-pressure side on-off valve 22*a*.

Thus, in the heat pump cycle 10 of the cool-down outside air endothermic heating mode, the refrigerant discharged from the compressor 11 circulates as in the sole outside air endothermic heating mode. At the same time, the refrigerant discharged from the compressor 11 is switched to a refrigerant circuit that circulates through the interior condenser 13, the high-pressure side passage 21*b*, the cool-down expansion valve 14*c* in the throttling state, the chiller 20, the accumulator 23, and the suction port of the compressor 11 in this order. That is, the outside air heat exchanger 15 and the chiller 20 are switched to the refrigerant circuit connected in parallel to the flow of the refrigerant.

In the low-temperature side heat medium circuit 40 in the cool-down outside air endothermic heating mode, as in the cool-down and cooling mode, the control device 60 operates the low-temperature side pump 41. Thus, in the low-temperature side heat medium circuit 40 in the cool-down outside air endothermic heating mode, the low-temperature side heat medium pressure-fed from the low-temperature side pump 41 circulates as in the cool-down and cooling mode.

In the interior air conditioning unit 50 in the cool-down outside air endothermic heating mode, the control device 60 controls the rotation speed of the interior blower 52, the opening degree of the air mix door 54, and the like as in the sole cooling mode. Further, the control device 60 appropriately controls the operation of other control target devices.

Therefore, in the heat pump cycle 10 of the cool-down outside air endothermic heating mode, a vapor compression refrigeration cycle is configured in which the interior condenser 13 functions as a condenser and the outside air heat exchanger 15 and the chiller 20 function as an evaporator.

In the low-temperature side heat medium circuit 40 in the cool-down outside air endothermic heating mode, the low-temperature side heat medium cooled down in the chiller 20 flows into the cooling water passage 70*a* of the battery 70 as in the cool-down and cooling mode. Thus, the battery 70 is cooled down.

In the interior air conditioning unit 50 in the cool-down outside air endothermic heating mode, as in the sole outside air endothermic heating mode, the ventilation air whose temperature has been adjusted is blown into the vehicle interior, thereby implementing heating of the vehicle interior.

(d) Hot Gas Heating Mode

The hot gas heating mode is an operation mode for heating the vehicle interior. The hot gas heating mode is selected when the outside air temperature Tam is extremely low (in the present embodiment, the temperature is lower than −10° C.) with the automatic switch turned on.

In the heat pump cycle 10 of the hot gas heating mode, the control device 60 causes the heating expansion valve 14*a* to be in the fully closed state, causes the cooling expansion valve 14*b* to be in the fully closed state, causes the cool-down expansion valve 14*c* to be in the throttling state, and causes the bypass-side flow rate adjusting valve 14*d* to be in the throttling state. The control device 60 opens the high-pressure side on-off valve 22*a* and closes the low-pressure side on-off valve 22*b*.

Thus, in the heat pump cycle 10 of the hot gas heating mode, the refrigerant discharged from the compressor 11 circulates through the first three-way joint 12*a*, the interior condenser 13, the high-pressure side passage 21*b*, the cool-down expansion valve 14*c* in the throttling state, the sixth three-way joint 12*f*, the chiller 20, the accumulator 23, and the suction port of the compressor 11 in this order. At the same time, the refrigerant circuit is switched such that the refrigerant discharged from the compressor 11 circulates through the first three-way joint 12*a*, the bypass-side flow rate adjusting valve 14*d* disposed in the bypass passage 21*a* and in the throttling state, the sixth three-way joint 12*f*, the chiller 20, the accumulator 23, and the suction port of the compressor 11 in this order.

The control device 60 controls the rotation speed of the compressor 11 so that the chiller-side refrigerant pressure Pc approaches a predetermined target low pressure PSO1 for hot gas heating. The target low pressure PSO1 for hot gas heating is set so that the refrigerant evaporating temperature of the low-pressure side refrigerant in the chiller 20 is higher than the outside air temperature Tam.

Here, controlling the chiller-side refrigerant pressure Pc corresponding to the pressure of the suction refrigerant of the compressor 11 so as to approach a constant pressure is effective for stabilizing a discharge flow rate Gr (mass flow rate) of the compressor 11. This is because the density of the suction refrigerant can be made constant by using a saturated gas-phase refrigerant having a constant pressure as the suction refrigerant of the compressor 11. Therefore, it is easy to stabilize the discharge flow rate Gr of the compressor 11 at the same rotation speed.

The control device 60 controls the throttle opening of the cool-down expansion valve 14*c* so that the refrigerant on the outlet side of the chiller 20 approaches the saturated gas-phase refrigerant, that is, a superheating degree SHC of the refrigerant on the outlet side of the chiller 20 approaches 0° C. The superheating degree SHC of the refrigerant on the outlet side of the chiller 20 can be estimated from the chiller-side refrigerant temperature Tc and the chiller-side refrigerant pressure Pc detected by the chiller-side refrigerant temperature and pressure sensor 62*e*.

The control device 60 controls the throttle opening of the bypass-side flow rate adjusting valve 14*d* so that the high/low pressure difference AP of the cycle approaches a target high/low pressure difference APO1 for the hot gas heating mode. The high/low pressure difference AP is a value obtained by subtracting the chiller-side refrigerant pressure Pc from the discharge refrigerant pressure Pd.

The target high/low pressure difference APO1 for the hot gas heating mode is determined on the basis of the target blowing temperature TAO with reference to a control map stored in advance in the control device 60. In the control map for the hot gas heating mode, the target high/low pressure difference APO1 is determined to be increased with the increase in the target blowing temperature TAO so that the compression workload of the compressor 11 becomes an appropriate amount of heat for heating the ventilation air.

In the low-temperature side heat medium circuit 40 in the hot gas heating mode, the control device 60 stops the low-temperature side pump 41.

In the interior air conditioning unit 50 in the hot gas heating mode, as in the sole cooling mode, the control device 60 controls the rotation speed of the interior blower 52, the opening degree of the air mix door 54, and the like. Further, the control device 60 appropriately controls the operation of other control target devices.

Accordingly, in the heat pump cycle 10 of the hot gas heating mode, the flow of the refrigerant discharged from the compressor 11 is branched at the first three-way joint 12*a*. One refrigerant branched at the first three-way joint 12*a* flows into the interior condenser 13. The refrigerant flowing into the interior condenser 13 radiates heat to the ventilation air to lower enthalpy. Thus, the ventilation air is heated.

The refrigerant flowing out of the interior condenser 13 flows into the cool-down expansion valve 14*c* via the high-pressure side passage 21*b* and is decompressed. The refrigerant having a relatively low enthalpy and decompressed by the cool-down expansion valve 14*c* flows into the another inflow port of the sixth three-way joint 12*f*.

The other refrigerant branched at the first three-way joint 12*a* flows into the bypass passage 21*a*. The flow rate of the refrigerant flowing into the bypass passage 21*a* is adjusted and decompressed by the bypass-side flow rate adjusting valve 14*d*. The refrigerant having a relatively high enthalpy and decompressed by the bypass-side flow rate adjusting valve 14*d* flows into one inflow port of the sixth three-way joint 12*f*.

At the sixth three-way joint 12*f*, the flow of the refrigerant flowing out of the cool-down expansion valve 14*c* and the flow of the refrigerant flowing out of the bypass-side flow rate adjusting valve 14*d* are merged and mixed. The refrigerant flowing out of the sixth three-way joint 12*f* flows into the chiller 20 and is further homogeneously mixed. The refrigerant flowing out of the refrigerant passage of the chiller 20 flows into the accumulator 23. The gas-phase refrigerant separated in the accumulator 23 is sucked into the compressor 11 and compressed again.

In the interior air conditioning unit 50 in the hot gas heating mode, as in the sole outside air endothermic heating mode, the ventilation air whose temperature has been adjusted is blown into the vehicle interior, thereby implementing heating of the vehicle interior.

Here, the hot gas heating mode is executed when the outside air temperature Tam is extremely low. Thus, when the refrigerant flowing out of the interior condenser 13 flows into the outside air heat exchanger 15, the refrigerant may radiate heat to the outside air in the outside air heat exchanger 15. When the refrigerant radiates heat to the outside air in the outside air heat exchanger 15, a heat radiation amount of the refrigerant radiates heat to the ventilation air in the interior condenser 13 decreases, and the heating capability of the ventilation air decreases.

On the other hand, in the hot gas heating mode, since the refrigerant circuit is switched such that the refrigerant flowing out of the interior condenser 13 does not flow into the outside air heat exchanger 15, it is possible to suppress the refrigerant from radiating heat to the outside air in the outside air heat exchanger 15.

In the hot gas heating mode, the throttle opening of the cool-down expansion valve 14*c* is controlled so that the refrigerant on the outlet side of the chiller 20 approaches the saturated gas-phase refrigerant. In this manner, even when the refrigerant discharge capacity of the compressor 11 is increased and the amount of heat dissipated from the refrigerant to the ventilation air at the interior condenser 13 is increased, the cycle can be balanced.

Therefore, in the hot gas heating mode, even when the outside air temperature Tam is extremely low, the heat generated by the work of the compressor 11 can be effectively used to heat the ventilation air, and heating of the vehicle interior can be implemented.

As described above, in the vehicle air conditioner 1 of the present embodiment, comfortable air conditioning in the vehicle interior and appropriate temperature adjustment of the battery 70 which is an in-vehicle device can be performed by switching the operation mode.

Incidentally, in the outside air endothermic heating mode described above, the outside air heat exchanger 15 causes the refrigerant to absorb heat of the outside air. Thus, when the outside air endothermic heating mode is executed at a low outside air temperature at which the outside air temperature Tam is equal to or lower than 0° C., frost may be formed on the outside air heat exchanger 15.

If the frost is formed on the outside air heat exchanger 15, the air passage for the outside air of the outside air heat exchanger 15 is blocked by the frost, so that the heat exchange performance of the outside air heat exchanger 15 is deteriorated. As a result, the refrigerant cannot sufficiently absorb heat of the outside air in the outside air heat exchanger 15, and the heating capability of the ventilation air in the interior condenser 13 is deteriorated.

Thus, the vehicle air conditioner 1 of the present embodiment operates in the defrosting mode of removing frost adhering to the outside air heat exchanger 15 when frost is formed on the outside air heat exchanger 15. The vehicle air conditioner 1 switches various defrosting modes in order to quickly and efficiently complete the defrosting of the outside air heat exchanger 15. The defrosting mode is switched by executing the control flow illustrated in FIG. 4.

Figure 4:
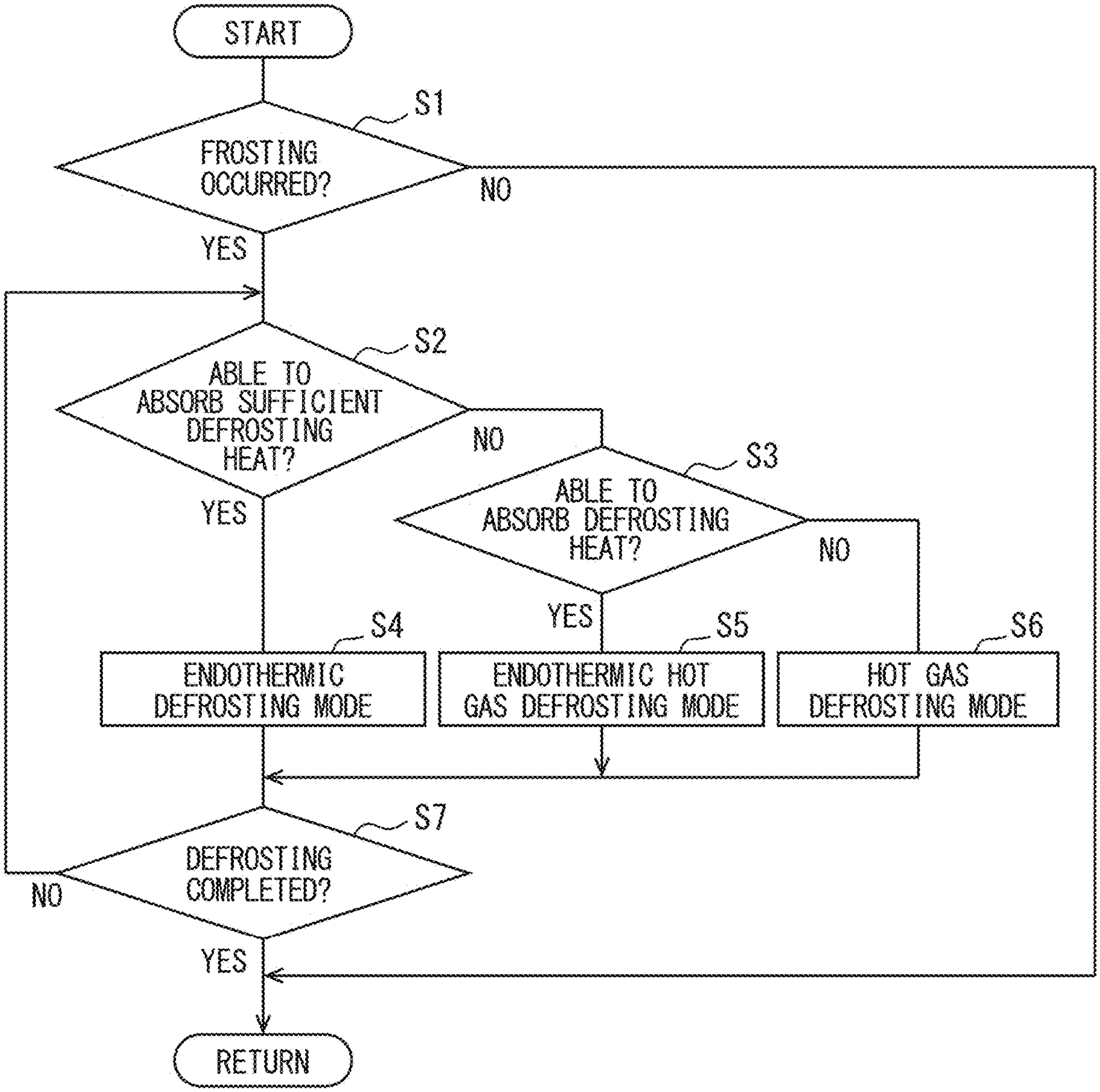
FIG. 4 is a flowchart of a subroutine of a control program of the embodiment.

The control flow illustrated in FIG. 4 is a subroutine called every predetermined period when the heating mode (in the present embodiment, the outside air endothermic heating mode) is selected in the main routine of the control program. Each control step of the flowchart illustrated in FIG. 4 is a function implementation unit included in the control device 60.

First, in step S1 of FIG. 4, it is determined whether frosting has occurred in the outside air heat exchanger 15. In step S1, it is determined that frosting has occurred in the outside air heat exchanger 15 when a predetermined frosting condition is satisfied. The frost formation condition of the present embodiment is satisfied when the time during which the outside air side refrigerant temperature T2 detected by the outside-air side refrigerant temperature and pressure sensor 62*c* is equal to or lower than a predetermined frost formation determination temperature KTf1 is equal to or longer than a predetermined frost formation determination time KTmf1.

If it is determined in step S1 that frosting has occurred in the outside air heat exchanger 15, the process proceeds to step S2. If it is determined in step S1 that frosting has not occurred in the outside air heat exchanger 15, the process returns to the main routine.

In step S2, it is determined whether the refrigerant is able to absorb sufficient defrosting heat from the battery 70 via the low-temperature side heat medium in the chiller 20. Here, the sufficient defrosting heat means heat sufficient for completing the defrosting of the outside air heat exchanger 15. Specifically, in step S2, it is determined whether the low-temperature side heat medium temperature TWL detected by the low-temperature side heat medium temperature sensor 63*b* is equal to or higher than a predetermined first reference heat medium temperature KTWL1.

When it is determined in step S2 that the low-temperature side heat medium temperature TWL is equal to or higher than the first reference heat medium temperature KTWL1, it is determined that the refrigerant is able to absorb sufficient defrosting heat from the battery 70, and the process proceeds to step S4. In step S4, the endothermic defrosting mode is executed, and the process proceeds to step S7.

If it is determined in step S2 that the low-temperature side heat medium temperature TWL is not equal to or higher than the first reference heat medium temperature KTWL1, it is determined that the refrigerant cannot absorb sufficient defrosting heat from the battery 70, and the process proceeds to step S3.

In step S3, the chiller 20 determines whether the refrigerant is able to absorb the defrosting heat from the battery 70 via the low-temperature side heat medium. Specifically, in step S3, it is determined whether the low-temperature side heat medium temperature TWL is equal to or higher than a predetermined second reference heat medium temperature KTWL2. The second reference heat medium temperature KTWL2 is set to a value lower than the first reference heat medium temperature KTWL1.

If it is determined in step S3 that the low-temperature side heat medium temperature TWL is equal to or higher than the second reference heat medium temperature KTWL2, it is determined that the defrosting heat is not sufficient, but the refrigerant is able to absorb the defrosting heat from the battery 70, and the process proceeds to step S5. In step S5, the endothermic hot gas defrosting mode is executed, and the process proceeds to step S7.

If it is determined in step S3 that the low-temperature side heat medium temperature TWL is not equal to or higher than the second reference heat medium temperature KTWL2, it is determined that the refrigerant cannot absorb the defrosting heat from the battery 70, and the process proceeds to step S6. In step S6, the hot gas defrosting mode is executed, and the process proceeds to step S7.

In step S7, it is determined whether defrosting of the outside air heat exchanger 15 has been completed. In step S7, when a predetermined end condition is satisfied, it is determined that the defrosting of the outside air heat exchanger 15 has been completed. The end condition of the present embodiment is satisfied when the time during which the outside air side refrigerant temperature T2 is equal to or higher than a predetermined end determination temperature KTf2 is equal to or longer than the predetermined end determination time KTmf2.

If it is determined in step S7 that the defrosting of the outside air heat exchanger 15 has been completed, the process returns to the main routine. If it is determined in step S7 that the defrosting of the outside air heat exchanger 15 has not been completed, the process returns to step S2. Each defrosting mode will be described below.

(e-1) Endothermic Defrosting Mode

First, the endothermic defrosting mode executed in step S4 will be described. The endothermic defrosting mode includes a sole endothermic defrosting mode for defrosting the outside air heat exchanger 15 without heating the vehicle interior, and a heating endothermic defrosting mode for heating the vehicle interior and defrosting the outside air heat exchanger 15.

In the control program of the present embodiment, when the heating switch of the operation panel 69 is turned on during the defrosting mode, a heating/defrosting mode for heating the vehicle interior and defrosting the outside air heat exchanger 15 is executed.

(e-1-1) Sole Endothermic Defrosting Mode

In the heat pump cycle 10 of the sole endothermic defrosting mode, the control device 60 causes the heating expansion valve 14*a* to be in the fully open state, causes the cooling expansion valve 14*b* to be in the fully closed state, causes the cool-down expansion valve 14*c* to be in the throttling state, and causes the bypass-side flow rate adjusting valve 14*d* to be in the fully closed state. The control device 60 closes the high-pressure side on-off valve 22*a* and closes the low-pressure side on-off valve 22*b*.

Figure 5:
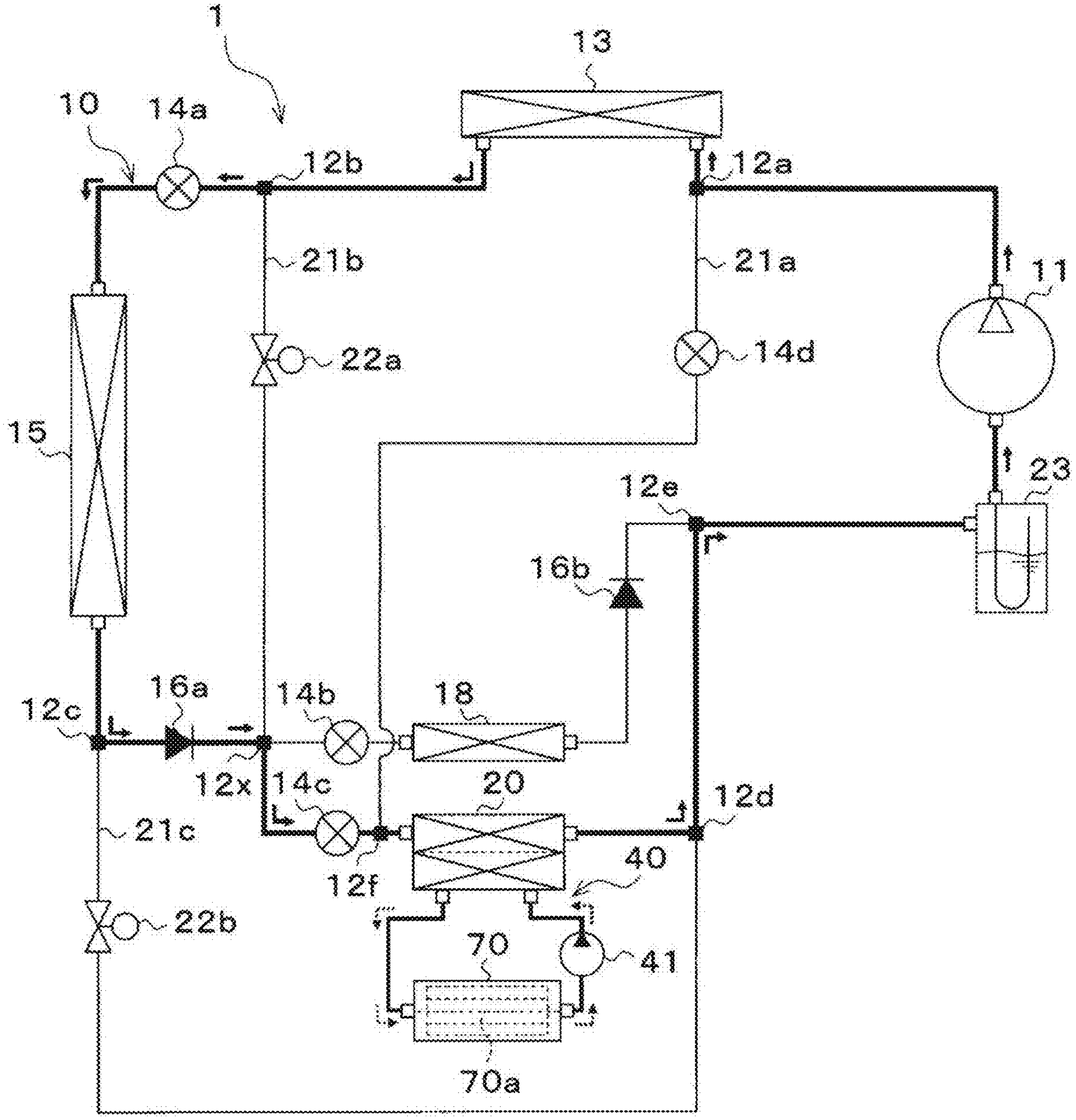
FIG. 5 is a schematic overall configuration diagram illustrating a flow of a refrigerant and the like during an endothermic defrosting mode of a heat pump cycle of the embodiment.

Thus, in the heat pump cycle 10 of the sole endothermic defrosting mode, as indicated by solid arrows in FIG. 5, the refrigerant circuit is switched such that the refrigerant discharged from the compressor 11 circulates through the interior condenser 13, the heating expansion valve 14*a* in the fully open state, the outside air heat exchanger 15, the cool-down expansion valve 14*c* in the throttling state, the chiller 20, the accumulator 23, and the suction port of the compressor 11 in this order.

Further, the control device 60 controls the rotation speed of the compressor 11 so that the outside air side refrigerant pressure P2 detected by the outside-air side refrigerant temperature and pressure sensor 62*c* approaches a predetermined reference defrosting pressure KPdf.

The reference defrosting pressure KPdf is set so that the temperature of the refrigerant flowing into the outside air heat exchanger 15 becomes the reference defrosting temperature KTdf. The reference defrosting temperature KTdf is set so that the defrosting of the outside air heat exchanger 15 can be quickly completed without unnecessarily increasing the outside air side refrigerant pressure P2. Therefore, the control device 60 controls the rotation speed of the compressor 11 so that the temperature of the refrigerant flowing into the outside air heat exchanger 15 approaches the reference defrosting temperature KTdf.

In the low-temperature side heat medium circuit 40 in the sole endothermic defrosting mode, the control device 60 operates the low-temperature side pump 41 as in the cool-down and cooling mode. Thus, in the low-temperature side heat medium circuit 40 in the sole endothermic defrosting mode, the low-temperature side heat medium pressure-fed from the low-temperature side pump 41 circulates as indicated by broken line arrows in FIG. 5 as in the cool-down and cooling mode.

In the interior air conditioning unit 50 in the sole endothermic defrosting mode, the control device 60 stops the interior blower 52. The control device 60 causes the air mix door 54 to move so as to close the air passage on the interior condenser 13 side. Further, the control device 60 appropriately controls the operation of other control target devices.

Accordingly, in the heat pump cycle 10 of the sole endothermic defrosting mode, the refrigerant discharged from the compressor 11 flows into the interior condenser 13 via the first three-way joint 12*a*. In the sole endothermic defrosting mode, since the interior blower 52 is stopped and the air mix door 54 closes the air passage on the interior condenser 13 side, the refrigerant flowing into the interior condenser 13 flows out of the interior condenser 13 without releasing heat to the ventilation air.

The refrigerant flowing out of the interior condenser 13 flows into the outside air heat exchanger 15 via the heating expansion valve 14*a* in the fully open state. The refrigerant flowing into outside air heat exchanger 15 radiates heat to frost adhering to the outside air heat exchanger 15 and condenses when flowing through the outside air heat exchanger 15. Thus, the frost adhering to the outside air heat exchanger 15 is melted, and defrosting of the outside air heat exchanger 15 is implemented.

The refrigerant flowing out of the outside air heat exchanger 15 flows into the cool-down expansion valve 14*c* and is decompressed. The low-pressure side refrigerant decompressed by the cool-down expansion valve 14*c* flows into the refrigerant passage of the chiller 20. The low-pressure side refrigerant flowing into the chiller 20 absorbs the defrosting heat from the low-temperature side heat medium flowing through the heat medium passage and evaporates.

The refrigerant flowing out of the chiller 20 flows into the accumulator 23 and is separated into gas and liquid. The gas-phase refrigerant flowing out of the accumulator 23 is sucked into the compressor 11 and compressed again.

In the low-temperature side heat medium circuit 40 in the sole endothermic defrosting mode, the low-temperature side heat medium pressure-fed from the low-temperature side pump 41 flows into the heat medium passage of the chiller 20. The low-temperature side heat medium flowing into the chiller 20 is cooled down by the low-temperature side refrigerant flowing through the refrigerant passage absorbing the defrosting heat.

The low-temperature side heat medium flowing out from the heat medium passage of the chiller 20 flows into the cooling water passage 70*a* of the battery 70. The low-temperature side heat medium flowing into the cooling water passage 70*a* of the battery 70 absorbs the defrosting heat generated by the battery 70. The low-temperature side heat medium flowing out of the cooling water passage 70*a* of the battery 70 is sucked into the low-temperature side pump 41 and pressure-fed to the heat medium passage of the chiller 20 again.

(e-1-2) Heating Endothermic Defrosting Mode

In the heat pump cycle 10 of the heating endothermic defrosting mode, the control device 60 causes the heating expansion valve 14*a* to be in the throttling state, causes the cooling expansion valve 14*b* to be in the fully closed state, causes the cool-down expansion valve 14*c* to be in the throttling state, and causes the bypass-side flow rate adjusting valve 14*d* to be in the fully closed state. The control device 60 closes the high-pressure side on-off valve 22*a* and closes the low-pressure side on-off valve 22*b*.

Thus, in the heat pump cycle 10 of the heating endothermic defrosting mode, as indicated by solid arrows in FIG. 5, the refrigerant circuit is switched such that the refrigerant discharged from the compressor 11 circulates through the interior condenser 13, the heating expansion valve 14*a* in the throttling state, the outside air heat exchanger 15, the cool-down expansion valve 14*c* in the throttling state, the chiller 20, the accumulator 23, and the suction port of the compressor 11 in this order.

As in the outside air endothermic heating mode, the control device 60 controls the rotation speed of the compressor 11 so that the discharge refrigerant pressure Pd approaches the heating target pressure PDO.

The control device 60 controls the throttle opening of the heating expansion valve 14*a* so that the outside air side refrigerant pressure P2 approaches the reference defrosting pressure KPdf.

In the low-temperature side heat medium circuit 40 in the heating endothermic defrosting mode, as in the cool-down and cooling mode, the control device 60 operates the low-temperature side pump 41. Thus, in the low-temperature side heat medium circuit 40 in the heating endothermic defrosting mode, the low-temperature side heat medium pressure-fed from the low-temperature side pump 41 circulates as indicated by the broken line arrows in FIG. 5 as in the cool-down and cooling mode.

In the interior air conditioning unit 50 in the heating endothermic defrosting mode, the control device 60 controls the rotation speed of the interior blower 52, the opening degree of the air mix door 54, and the like as in the sole cooling mode. Further, the control device 60 appropriately controls the operation of other control target devices.

Accordingly, in the heat pump cycle 10 of the heating endothermic defrosting mode, the refrigerant discharged from the compressor 11 flows into the interior condenser 13 via the first three-way joint 12*a*. The refrigerant flowing into the interior condenser 13 radiates heat to the ventilation air and condenses in accordance with the opening degree of the air mix door 54.

The refrigerant flowing out of the interior condenser 13 is decompressed by the heating expansion valve 14*a*. Thus, the outside air side refrigerant pressure P2 approaches the reference defrosting pressure KPdf. That is, the temperature of the refrigerant flowing into the outside air heat exchanger 15 approaches the reference defrosting temperature KTdf.

The refrigerant decompressed by the heating expansion valve 14*a* flows into the outside air heat exchanger 15. The refrigerant flowing into outside air heat exchanger 15 radiates heat to frost adhering to the outside air heat exchanger 15 and condenses when flowing through the outside air heat exchanger 15. Thus, the frost adhering to the outside air heat exchanger 15 is melted, and defrosting of the outside air heat exchanger 15 is implemented. Subsequent operations of the heat pump cycle 10 are similar to those in the sole endothermic defrosting mode.

In the low-temperature side heat medium circuit 40 in the heating endothermic defrosting mode, as in the sole endothermic defrosting mode, the low-temperature side heat medium flowing into the cooling water passage 70*a* of the battery 70 absorbs the defrosting heat generated by the battery 70. The defrosting heat of the low-temperature side heat medium flowing into the chiller 20 is absorbed by the low-temperature side refrigerant flowing through the refrigerant passage.

In the interior air conditioning unit 50 in the heating endothermic defrosting mode, as in the sole outside air endothermic heating mode, the ventilation air whose temperature has been adjusted is blown into the vehicle interior, thereby implementing heating of the vehicle interior.

In the heating endothermic defrosting mode, the defrosting heat absorbed by the refrigerant in the chiller 20 is radiated not only to the frost on the outside air heat exchanger 15 but also to the ventilation air. Thus, in the heating endothermic defrosting mode, the low-temperature side heat medium temperature TWL is more likely to decrease than in the sole endothermic defrosting mode. Therefore, the heating endothermic defrosting mode is more likely to shift to the endothermic hot gas defrosting mode than the sole endothermic defrosting mode.

(e-2) Endothermic Hot Gas Defrosting Mode

Next, the endothermic hot gas defrosting mode executed in step S5 will be described. The endothermic defrosting mode includes a sole endothermic hot gas defrosting mode for defrosting the outside air heat exchanger 15 without heating the vehicle interior, and a heating endothermic hot gas defrosting mode for heating the vehicle interior and defrosting the outside air heat exchanger 15.

(e-2-1) Sole Endothermic Hot Gas Defrosting Mode

In the heat pump cycle 10 of the sole endothermic hot gas defrosting mode, the control device 60 causes the heating expansion valve 14*a* to be in the fully open state or the throttling state, causes the cooling expansion valve 14*b* to be in the fully closed state, causes the cool-down expansion valve 14*c* to be in the throttling state, and causes the bypass-side flow rate adjusting valve 14*d* to be in the throttling state. The control device 60 closes the high-pressure side on-off valve 22*a* and closes the low-pressure side on-off valve 22*b*.

Figure 6:
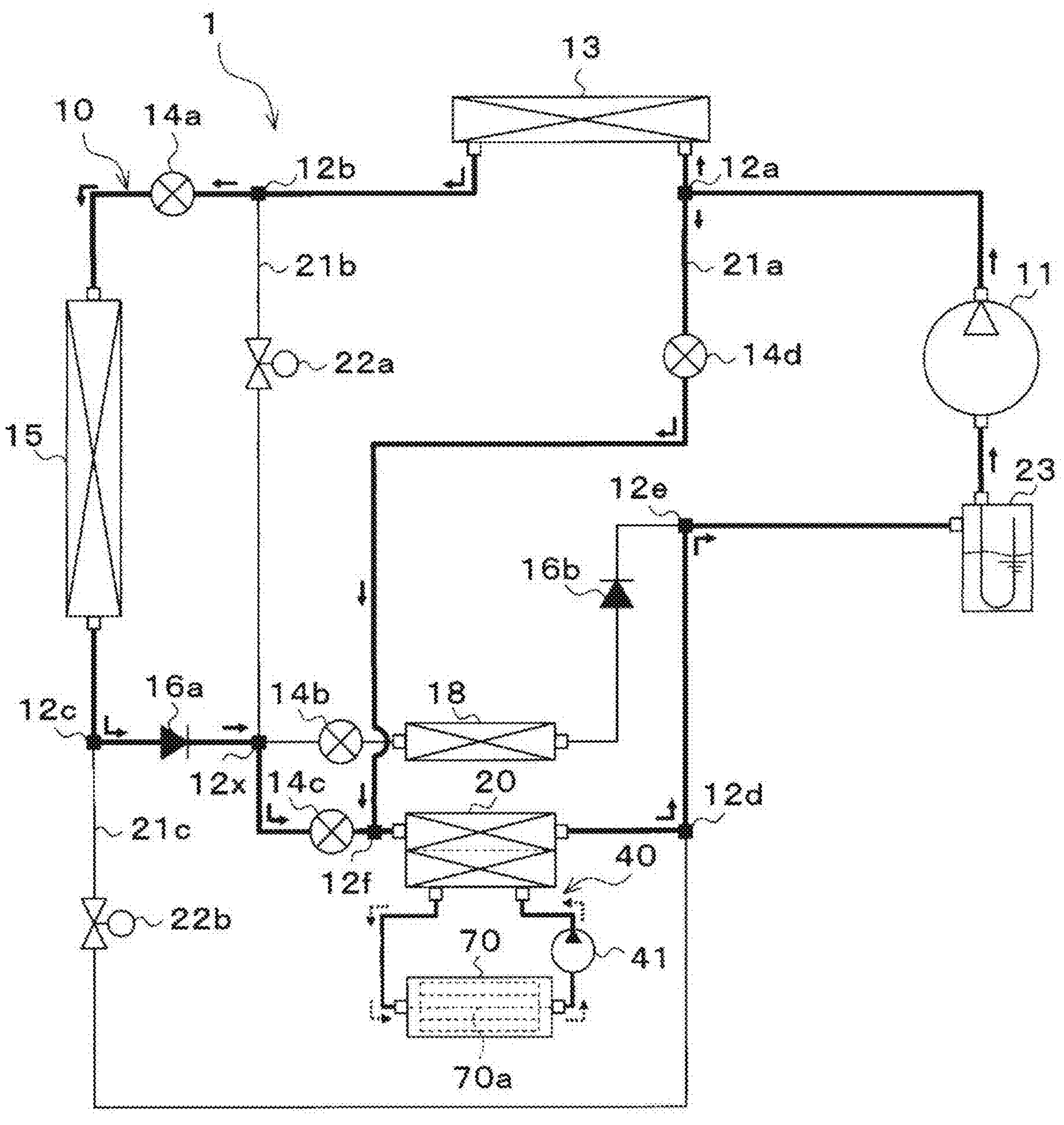
FIG. 6 is a schematic overall configuration diagram illustrating a flow of a refrigerant and the like during an endothermic hot gas defrosting mode of the heat pump cycle of the embodiment.

Thus, in the heat pump cycle 10 of the sole endothermic hot gas defrosting mode, as indicated by solid arrows in FIG. 6, the refrigerant discharged from the compressor 11 circulates through the first three-way joint 12*a*, the interior condenser 13, the heating expansion valve 14*a* in the fully open state or the throttling state, the outside air heat exchanger 15, the cool-down expansion valve 14*c* in the throttling state, the sixth three-way joint 12*f*, the chiller 20, the accumulator 23, and the suction port of the compressor 11 in this order. At the same time, the refrigerant circuit is switched such that the refrigerant discharged from the compressor 11 circulates through the first three-way joint 12*a*, the bypass-side flow rate adjusting valve 14*d* disposed in the bypass passage 21*a* and in the throttling state, the sixth three-way joint 12*f*, the chiller 20, the accumulator 23, and the suction port of the compressor 11 in this order.

The control device 60 further controls the refrigerant discharge capacity of the compressor 11 so that the chiller-side refrigerant pressure Pc approaches a predetermined target low pressure PSO2 for heat absorbing hot gas defrosting. The target low pressure PSO2 for heat absorbing hot gas defrosting is set so that the refrigerant evaporating temperature of the low-pressure side refrigerant in the chiller 20 is lower than the second reference heat medium temperature KTWL2.

As in the heating endothermic defrosting mode, the control device 60 controls the throttle opening of the heating expansion valve 14*a* so that the outside air side refrigerant pressure P2 approaches the reference defrosting pressure KPdf. As in the hot gas heating mode, the control device 60 controls the throttle opening of the cool-down expansion valve 14*c* so that the refrigerant on the outlet side of the chiller 20 approaches the saturated gas-phase refrigerant.

The control device 60 controls the throttle opening of the bypass-side flow rate adjusting valve 14*d* so that the high/low pressure difference AP of the cycle approaches a target high/low pressure difference APO2 for the sole endothermic hot gas defrosting mode. The target high/low pressure difference APO2 for the sole endothermic hot gas defrosting mode is determined with reference to a control map stored in advance in the control device 60.

Here, the target high/low pressure difference APO2 for the sole endothermic hot gas defrosting mode is set so that the defrosting of the outside air heat exchanger 15 can be quickly and efficiently completed. That is, the refrigerant discharge capacity of the compressor 11 is set not to be unnecessarily increased. Thus, the discharge refrigerant pressure Pd may be equal to the reference defrosting pressure KPdf. In this case, the heating expansion valve 14*a* is in the fully open state.

In the low-temperature side heat medium circuit 40 in the sole endothermic hot gas defrosting mode, the control device 60 operates the low-temperature side pump 41 as in the cool-down and cooling mode. Thus, in the low-temperature side heat medium circuit 40 in the sole endothermic hot gas defrosting mode, the low-temperature side heat medium pressure-fed from the low-temperature side pump 41 circulates as indicated by broken line arrows in FIG. 6 as in the cool-down and cooling mode.

In the interior air conditioning unit 50 in the sole endothermic hot gas defrosting mode, as in the sole endothermic defrosting mode, the control device 60 stops the interior blower 52 and causes the air mix door 54 to move so as to close the air passage on the interior condenser 13 side. Further, the control device 60 appropriately controls the operation of other control target devices.

Figure 7:
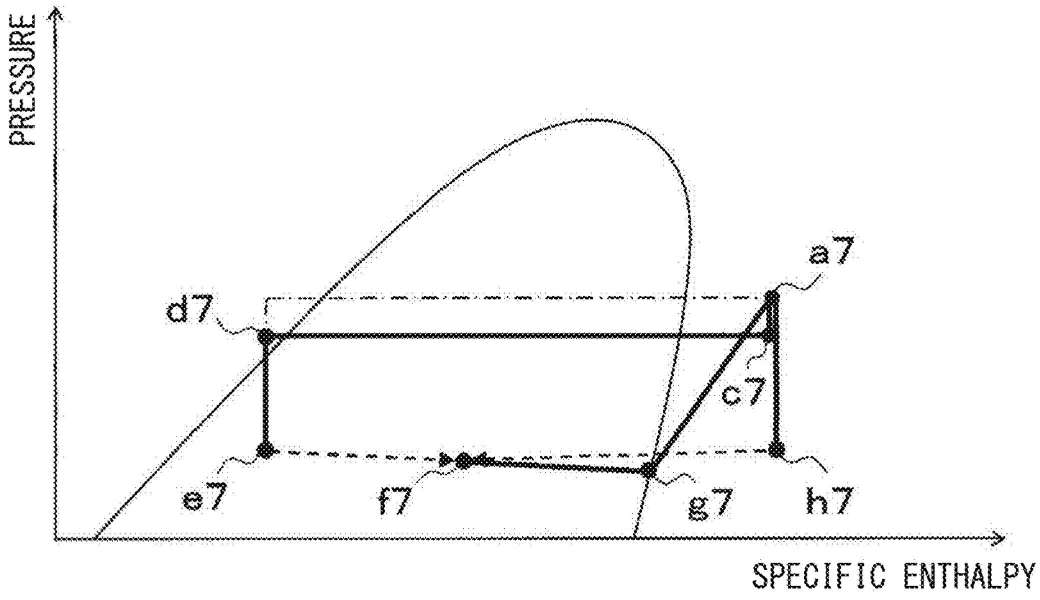
FIG. 7 is a Mollier diagram illustrating a state of a refrigerant during a sole endothermic hot gas defrosting mode of the heat pump cycle of the embodiment.

Therefore, in the heat pump cycle 10 of the sole endothermic hot gas defrosting mode, the state of the refrigerant changes as illustrated in the Mollier diagram of FIG. 7.

That is, the flow of the discharge refrigerant (point a7 in FIG. 7) discharged from the compressor 11 is branched at the first three-way joint 12*a*. One refrigerant branched at the first three-way joint 12*a* flows into the interior condenser 13. In the sole endothermic hot gas defrosting mode, since the interior blower 52 is stopped and the air mix door 54 closes the air passage on the interior condenser 13 side, the refrigerant flowing into the interior condenser 13 flows out of the interior condenser 13 without releasing heat to the ventilation air.

The refrigerant flowing out of the interior condenser 13 is decompressed by the heating expansion valve 14*a* (from point a7 to point c7 in FIG. 7). Thus, the outside air side refrigerant pressure P2 approaches the reference defrosting pressure KPdf. That is, the temperature of the refrigerant flowing into the outside air heat exchanger 15 approaches the reference defrosting temperature KTdf.

The refrigerant decompressed by the heating expansion valve 14*a* flows into the outside air heat exchanger 15. The refrigerant having flowed into the outside air heat exchanger 15 radiates heat to frost adhering to the outside air heat exchanger 15 and condenses when flowing through the outside air heat exchanger 15 (from point c7 to point d7 in FIG. 7). Thus, the frost adhering to the outside air heat exchanger 15 is melted, and defrosting of the outside air heat exchanger 15 is implemented.

As described above, the heating expansion valve 14*a* may be fully opened in the sole endothermic hot gas defrosting mode. In this case, the state of the refrigerant changes as indicated by an alternate long and short dash line in FIG. 7.

The refrigerant flowing out of the outside air heat exchanger 15 flows into the cool-down expansion valve 14*c* and is decompressed (from point d7 to point e7 in FIG. 7). The low-pressure side refrigerant decompressed by the cool-down expansion valve 14*c* flows into the another inflow port of the sixth three-way joint 12*f*.

The other refrigerant branched at the first three-way joint 12*a* flows into the bypass passage 21*a*. The flow rate of the refrigerant flowing into the bypass passage 21*a* is adjusted and reduced by the bypass-side flow rate adjusting valve 14*d* (from point a7 to point h7 in FIG. 7). The refrigerant having a relatively high enthalpy and decompressed by the bypass-side flow rate adjusting valve 14*d* flows into the one inflow port of the sixth three-way joint 12*f*.

At the sixth three-way joint 12*f*, the flow of the refrigerant flowing out of the cool-down expansion valve 14*c* and the flow of the refrigerant flowing out of the bypass-side flow rate adjusting valve 14*d* are merged and mixed (from point e7 to point f7 in FIG. 7, from point h7 to point f7). The refrigerant flowing out of the sixth three-way joint 12*f* flows into the chiller 20. The low-pressure side refrigerant flowing into the chiller 20 absorbs the defrosting heat from the low-temperature side heat medium flowing through the heat medium passage and evaporates (from point f7 to point g7 in FIG. 7).

The refrigerant flowing out of the chiller 20 flows into the accumulator 23 and is separated into gas and liquid. The gas-phase refrigerant flowing out of the accumulator 23 is sucked into the compressor 11 and compressed again (from point g7 to point a7 in FIG. 7).

In the low-temperature side heat medium circuit 40 in the sole endothermic hot gas defrosting mode, as in the sole endothermic defrosting mode, the low-temperature side heat medium flowing into the cooling water passage 70*a* of the battery 70 absorbs the defrosting heat generated by the battery 70. The defrosting heat of the low-temperature side heat medium flowing into the chiller 20 is absorbed by the low-temperature side refrigerant flowing through the refrigerant passage.

(e-2-2) Heating Endothermic Hot Gas Defrosting Mode

In the heat pump cycle 10 of the heating endothermic hot gas defrosting mode, the control device 60 causes the heating expansion valve 14*a* to be in the throttling state, causes the cooling expansion valve 14*b* to be in the fully closed state, causes the cool-down expansion valve 14*c* to be in the throttling state, and causes the bypass-side flow rate adjusting valve 14*d* to be in the throttling state. The control device 60 closes the high-pressure side on-off valve 22*a* and closes the low-pressure side on-off valve 22*b*.

Thus, in the heat pump cycle 10 of the heating endothermic hot gas defrosting mode, as indicated by solid arrows in FIG. 6, the refrigerant discharged from the compressor 11 circulates through the first three-way joint 12*a*, the interior condenser 13, the heating expansion valve 14*a* in the throttling state, the outside air heat exchanger 15, the cool-down expansion valve 14*c* in the throttling state, the sixth three-way joint 12*f*, the chiller 20, the accumulator 23, and the suction port of the compressor 11 in this order. At the same time, the refrigerant circuit is switched such that the refrigerant discharged from the compressor 11 circulates through the first three-way joint 12*a*, the bypass-side flow rate adjusting valve 14*d* disposed in the bypass passage 21*a* and in the throttling state, the sixth three-way joint 12*f*, the chiller 20, the accumulator 23, and the suction port of the compressor 11 in this order.

As in the sole endothermic hot gas defrosting mode, the control device 60 controls the refrigerant discharge capacity of the compressor 11 so that the chiller-side refrigerant pressure Pc approaches the target low pressure PSO2 for defrosting the heat absorbing hot gas.

As in the heating endothermic defrosting mode, the control device 60 controls the throttle opening of the heating expansion valve 14*a* so that the outside air side refrigerant pressure P2 approaches the reference defrosting pressure KPdf. As in the hot gas heating mode, the control device 60 controls the throttle opening of the cool-down expansion valve 14*c* so that the refrigerant on the outlet side of the chiller 20 approaches the saturated gas-phase refrigerant.

The control device 60 controls the throttle opening of the bypass-side flow rate adjusting valve 14*d* so that the high/low pressure difference AP of the cycle approaches a target high/low pressure difference APO3 for the heating endothermic hot gas defrosting mode. The target high/low pressure difference APO3 for the heating endothermic hot gas defrosting mode is determined with reference to a control map stored in advance in the control device 60.

Here, the target high/low pressure difference APO3 for the heating endothermic hot gas defrosting mode is set so as to implement appropriate heating of the vehicle interior. In order to appropriately implement heating of the vehicle interior, more heat is required than defrosting of the outside air heat exchanger 15. Thus, the target high/low pressure difference APO3 for the heating endothermic hot gas defrosting mode is larger than the target high/low pressure difference APO2 for the sole endothermic hot gas defrosting mode.

In the low-temperature side heat medium circuit 40 in the heating endothermic hot gas defrosting mode, the control device 60 operates the low-temperature side pump 41 as in the cool-down and cooling mode. Thus, in the low-temperature side heat medium circuit 40 in the sole endothermic defrosting mode, the low-temperature side heat medium pressure-fed from the low-temperature side pump 41 circulates as indicated by the broken line arrows in FIG. 6 as in the cool-down and cooling mode.

In the interior air conditioning unit 50 in the heating endothermic hot gas defrosting mode, the control device 60 controls the rotation speed of the interior blower 52, the opening degree of the air mix door 54, and the like as in the sole cooling mode. Further, the control device 60 appropriately controls the operation of other control target devices.

Figure 8:
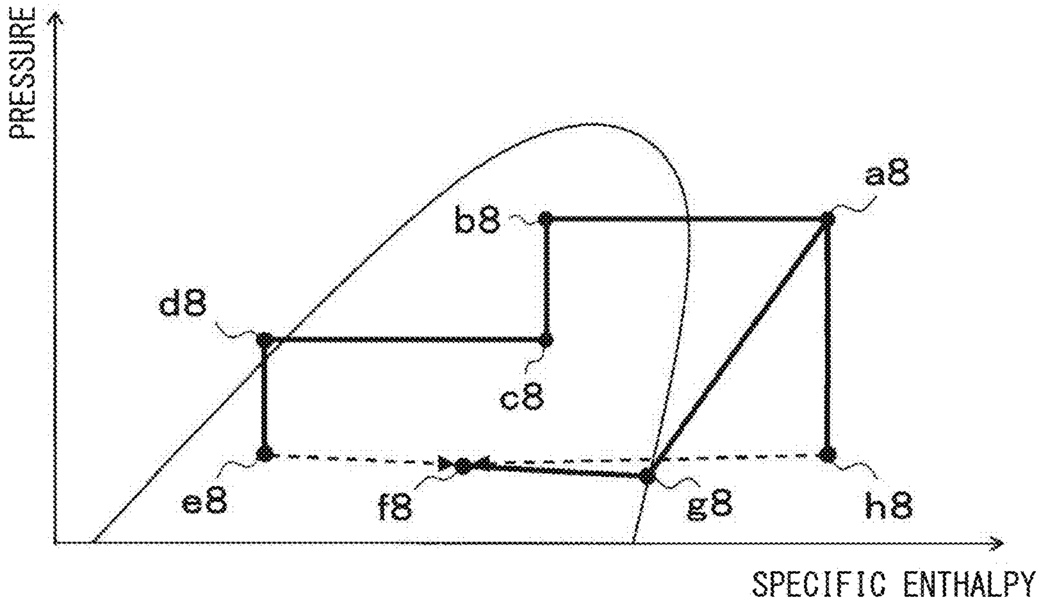
FIG. 8 is a Mollier diagram illustrating a state of a refrigerant during a heating endothermic hot gas defrosting mode of the heat pump cycle of the embodiment.

Therefore, in the heat pump cycle 10 of the heating endothermic hot gas defrosting mode, the state of the refrigerant changes as illustrated in a Mollier diagram of FIG. 8. In FIG. 8, the state of the refrigerant at an equivalent position on the cycle configuration with respect to the Mollier diagram of FIG. 7 described in the sole endothermic hot gas defrosting mode is indicated by the same reference sign (alphabet) as in FIG. 7, and only the subscript (numeral) is changed according to the figure number. The same applies to the following Mollier diagram.

That is, the flow of the discharge refrigerant (point a8 in FIG. 8) discharged from the compressor 11 is branched at the first three-way joint 12*a*. One refrigerant branched at the first three-way joint 12*a* flows into the interior condenser 13. The refrigerant having flowed into the interior condenser 13 exchanges heat with the ventilation air according to the opening degree of the air mix door 54 to radiate heat and condense (from point a8 to point b8 in FIG. 8). Thus, the ventilation air is heated.

The refrigerant flowing out of the interior condenser 13 is decompressed by the heating expansion valve 14*a* (from point b8 to point c8 in FIG. 8). Thus, the outside air side refrigerant pressure P2 approaches the reference defrosting pressure KPdf. That is, the temperature of the refrigerant flowing into the outside air heat exchanger 15 approaches the reference defrosting temperature KTdf.

The refrigerant decompressed by the heating expansion valve 14*a* flows into the outside air heat exchanger 15. The refrigerant having flowed into the outside air heat exchanger 15 radiates heat to frost adhering to the outside air heat exchanger 15 and condenses when flowing through the outside air heat exchanger 15 (from point c8 to point d8 in FIG. 8). Thus, the frost adhering to the outside air heat exchanger 15 is melted, and defrosting of the outside air heat exchanger 15 is implemented. Subsequent operations of the heat pump cycle 10 are similar to those in the sole endothermic hot gas defrosting mode.

In the low-temperature side heat medium circuit 40 in the heating endothermic hot gas defrosting mode, as in the sole endothermic hot gas defrosting mode, the low-temperature side heat medium flowing into the cooling water passage 70*a* of the battery 70 absorbs the defrosting heat generated by the battery 70. The defrosting heat of the low-temperature side heat medium flowing into the chiller 20 is absorbed by the low-temperature side refrigerant flowing through the refrigerant passage.

In the interior air conditioning unit 50 in the heating endothermic hot gas defrosting mode, as in a sole outside air endothermic heating mode, the ventilation air whose temperature has been adjusted is blown into the vehicle interior, thereby implementing heating of the vehicle interior.

In the heating endothermic hot gas defrosting mode, the defrosting heat absorbed by the refrigerant in the chiller 20 is radiated not only to the frost on the outside air heat exchanger 15 but also to the ventilation air. Thus, in the heating endothermic hot gas defrosting mode, the low-temperature side heat medium temperature TWL is more likely to decrease than in the sole endothermic hot gas defrosting mode. Therefore, the heating endothermic hot gas defrosting mode is more likely to shift to the hot gas defrosting mode than the sole endothermic hot gas defrosting mode.

(e-3) Hot Gas Defrosting Mode

Next, the hot gas defrosting mode executed in step S6 will be described. The hot gas defrosting mode includes a sole hot gas defrosting mode in which the outside air heat exchanger 15 is defrosted without heating the vehicle interior, and a heating hot gas defrosting mode in which the vehicle interior is heated and the outside air heat exchanger 15 is defrosted.

(e-3-1) Sole Hot Gas Defrosting Mode

In the heat pump cycle 10 of the sole hot gas defrosting mode, the control device 60 causes the heating expansion valve 14*a* to be in the fully open state or the throttling state, causes the cooling expansion valve 14*b* to be in the fully closed state, causes the cool-down expansion valve 14*c* to be in the throttling state, and causes the bypass-side flow rate adjusting valve 14*d* to be in the throttling state. The control device 60 closes the high-pressure side on-off valve 22*a* and closes the low-pressure side on-off valve 22*b*.

Figure 9:
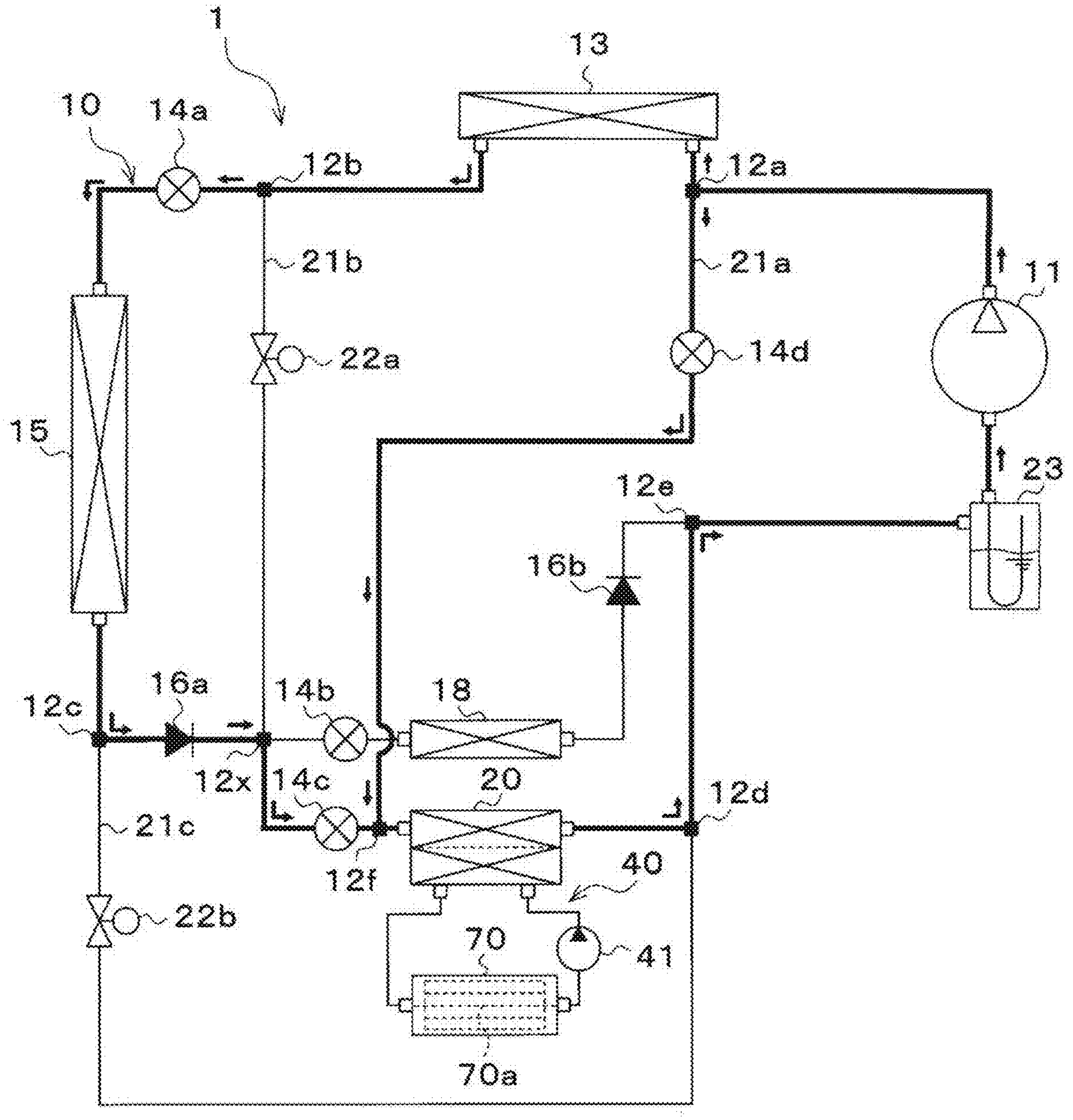
FIG. 9 is a schematic overall configuration diagram illustrating a flow of a refrigerant and the like during a hot gas defrosting mode of a heat pump cycle of the embodiment.

Thus, in the heat pump cycle 10 of the sole hot gas defrosting mode, as indicated by solid arrows in FIG. 9, the refrigerant discharged from the compressor 11 circulates through the first three-way joint 12*a*, the heating expansion valve 14*a* in the fully open state or the throttling state, the outside air heat exchanger 15, the cool-down expansion valve 14*c* in the throttling state, the sixth three-way joint 12*f*, the chiller 20, the accumulator 23, and the suction port of the compressor 11 in this order. At the same time, the refrigerant circuit is switched such that the refrigerant discharged from the compressor 11 circulates through the first three-way joint 12*a*, the bypass-side flow rate adjusting valve 14*d* disposed in the bypass passage 21*a* and in the throttling state, the sixth three-way joint 12*f*, the chiller 20, the accumulator 23, and the suction port of the compressor 11 in this order.

The control device 60 further controls the refrigerant discharge capacity of the compressor 11 so that the chiller-side refrigerant pressure Pc approaches a predetermined target low pressure PSO3 for hot gas defrosting. The target low pressure PSO3 for hot gas defrosting is set to a pressure higher than the target low pressure PSO2 for endothermic hot gas defrosting.

As in the heating endothermic defrosting mode, the control device 60 controls the throttle opening of the heating expansion valve 14*a* so that the outside air side refrigerant pressure P2 approaches the reference defrosting pressure KPdf. As in the hot gas heating mode, the control device 60 controls the throttle opening of the cool-down expansion valve 14*c* so that the refrigerant on the outlet side of the chiller 20 approaches the saturated gas-phase refrigerant.

The control device 60 controls the throttle opening of the bypass-side flow rate adjusting valve 14*d* so that the high/low pressure difference AP of the cycle approaches a target high/low pressure difference APO4 for the sole hot gas defrosting mode. The target high/low pressure difference APO4 for the sole hot gas defrosting mode is determined with reference to a control map stored in advance in the control device 60.

The target high/low pressure difference APO4 for the sole hot gas defrosting mode is set so that the defrosting of the outside air heat exchanger 15 can be quickly and efficiently completed. In other words, the refrigerant discharge capacity of the compressor 11 is set not to be unnecessarily increased. Thus, the discharge refrigerant pressure Pd may be equal to the reference defrosting pressure KPdf. In this case, the heating expansion valve 14*a* is in the fully open state.

In the low-temperature side heat medium circuit 40 in the sole hot gas defrosting mode, the control device 60 stops the low-temperature side pump 41.

In the interior air conditioning unit 50 in the sole hot gas defrosting mode, as in the sole endothermic defrosting mode, the control device 60 stops the interior blower 52 and causes the air mix door 54 to move so as to close the air passage on the interior condenser 13 side. Further, the control device 60 appropriately controls the operation of other control target devices.

Figure 10:
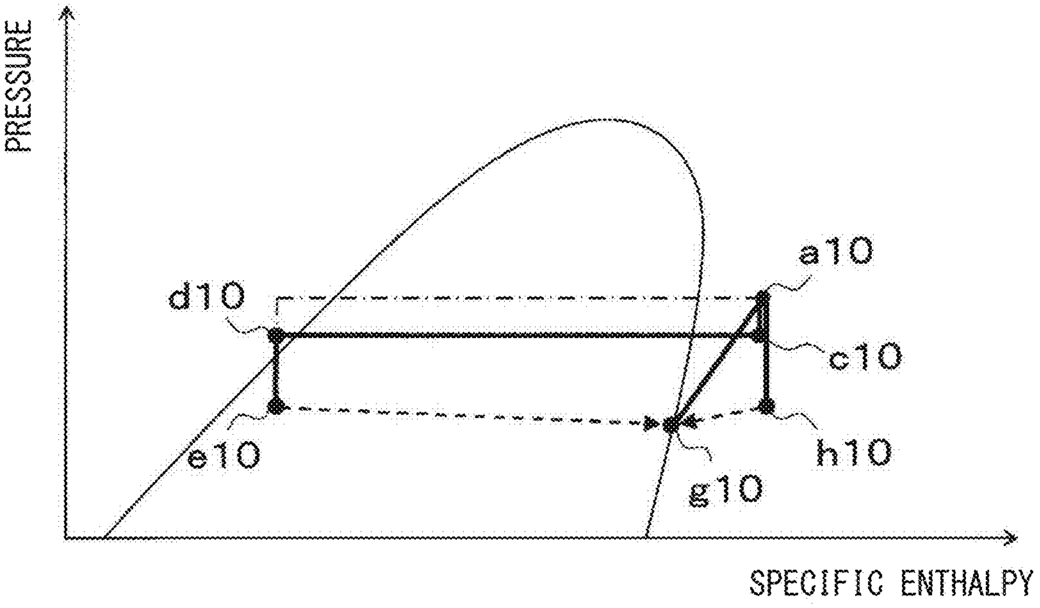
FIG. 10 is a Mollier diagram illustrating a state of a refrigerant during a sole hot gas defrosting mode of the heat pump cycle of the embodiment.

Therefore, in the heat pump cycle 10 of the sole hot gas defrosting mode, the state of the refrigerant changes as illustrated in the Mollier diagram of FIG. 10.

That is, the flow of the discharge refrigerant (point a10 in FIG. 10) discharged from the compressor 11 is branched at the first three-way joint 12*a*. One refrigerant branched at the first three-way joint 12*a* flows into the interior condenser 13. In the sole hot gas defrosting mode, since the interior blower 52 is stopped and the air mix door 54 closes the air passage on the interior condenser 13 side, the refrigerant flowing into the interior condenser 13 flows out of the interior condenser 13 without releasing heat to the ventilation air.

The refrigerant flowing out of the interior condenser 13 is decompressed by the heating expansion valve 14*a* (from point a10 to point c10 in FIG. 10). Thus, the outside air side refrigerant pressure P2 approaches the reference defrosting pressure KPdf. That is, the temperature of the refrigerant flowing into the outside air heat exchanger 15 approaches the reference defrosting temperature KTdf.

The refrigerant decompressed by the heating expansion valve 14*a* flows into the outside air heat exchanger 15. The refrigerant having flowed into the outside air heat exchanger 15 radiates heat to frost adhering to the outside air heat exchanger 15 and condenses when flowing through the outside air heat exchanger 15 (from point c10 to point d10 in FIG. 10). Thus, the frost adhering to the outside air heat exchanger 15 is melted, and defrosting of the outside air heat exchanger 15 is implemented.

As described above, in the sole hot gas defrosting mode, the heating expansion valve 14*a* may be fully opened as in the sole endothermic hot gas defrosting mode. In this case, the state of the refrigerant changes as indicated by an alternate long and short dash line in FIG. 10.

The refrigerant flowing out of the outside air heat exchanger 15 flows into the cool-down expansion valve 14*c* and is decompressed (from point d10 to point e10 in FIG. 10). The low-pressure side refrigerant decompressed by the cool-down expansion valve 14*c* flows into the another inflow port of the sixth three-way joint 12*f*.

The other refrigerant branched at the first three-way joint 12*a* flows into the bypass passage 21*a*. The flow rate of the refrigerant flowing into the bypass passage 21*a* is adjusted and reduced by the bypass-side flow rate adjusting valve 14*d* (from point a10 to point h10 in FIG. 10). The refrigerant having a relatively high enthalpy and decompressed by the bypass-side flow rate adjusting valve 14*d* flows into the one inflow port of the sixth three-way joint 12*f*.

At the sixth three-way joint 12*f*, the flow of the refrigerant flowing out of the cool-down expansion valve 14*c* and the flow of the refrigerant flowing out of the bypass-side flow rate adjusting valve 14*d* are merged and mixed (from point e10 to point g10, and from point h10 to point g10 in FIG. 10). The refrigerant flowing out of the sixth three-way joint 12*f* flows into the chiller 20 and is further homogeneously mixed.

The refrigerant flowing out of the chiller 20 flows into the accumulator 23 and is separated into gas and liquid. The gas-phase refrigerant flowing out of the accumulator 23 is sucked into the compressor 11 and compressed again (from point g10 to point a10 in FIG. 10).

(e-3-2) Heating Hot Gas Defrosting Mode

In the heat pump cycle 10 of the heating hot gas defrosting mode, the control device 60 causes the heating expansion valve 14*a* to be in the throttling state, causes the cooling expansion valve 14*b* to be in the fully closed state, causes the cool-down expansion valve 14*c* to be in the throttling state, and causes the bypass-side flow rate adjusting valve 14*d* to be in the throttling state. The control device 60 closes the high-pressure side on-off valve 22*a* and closes the low-pressure side on-off valve 22*b*.

Thus, in the heat pump cycle 10 of the heating hot gas defrosting mode, as indicated by solid arrows in FIG. 9, the refrigerant discharged from the compressor 11 circulates through the first three-way joint 12*a*, the heating expansion valve 14*a* in the throttling state, the outside air heat exchanger 15, the cool-down expansion valve 14*c* in the throttling state, the sixth three-way joint 12*f*, the chiller 20, the accumulator 23, and the suction port of the compressor 11 in this order. At the same time, the refrigerant circuit is switched such that the refrigerant discharged from the compressor 11 circulates through the first three-way joint 12*a*, the bypass-side flow rate adjusting valve 14*d* disposed in the bypass passage 21*a* and in the throttling state, the sixth three-way joint 12*f*, the chiller 20, the accumulator 23, and the suction port of the compressor 11 in this order.

As in the sole hot gas defrosting mode, the control device 60 controls the refrigerant discharge capacity of the compressor 11 so that the chiller-side refrigerant pressure Pc approaches the target low pressure PSO3 for hot gas defrosting.

As in the heating endothermic defrosting mode, the control device 60 controls the throttle opening of the heating expansion valve 14*a* so that the outside air side refrigerant pressure P2 approaches the reference defrosting pressure KPdf. As in the hot gas heating mode, the control device 60 controls the throttle opening of the cool-down expansion valve 14*c* so that the refrigerant on the outlet side of the chiller 20 approaches the saturated gas-phase refrigerant.

The control device 60 controls the throttle opening of the bypass-side flow rate adjusting valve 14*d* so that the high/low pressure difference AP of the cycle approaches a target high/low pressure difference APO5 for the heating hot gas defrosting mode. The target high/low pressure difference APO5 for the heating hot gas defrosting mode is determined with reference to a control map stored in advance in the control device 60.

Here, the target high/low pressure difference APO5 for the heating hot gas defrosting mode is set so as to implement appropriate heating of the vehicle interior. In order to appropriately implement heating of the vehicle interior, more heat is required than defrosting of the outside air heat exchanger 15. Thus, the target high/low pressure difference APO5 for the heating hot gas defrosting mode is larger than the target high/low pressure difference APO4 for the sole hot gas defrosting mode.

In the low-temperature side heat medium circuit 40 in the heating hot gas defrosting mode, the control device 60 stops the low-temperature side pump 41.

In the interior air conditioning unit 50 in the heating hot gas defrosting mode, the control device 60 controls the rotation speed of the interior blower 52, the opening degree of the air mix door 54, and the like, as in the sole cooling mode. Further, the control device 60 appropriately controls the operation of other control target devices.

Figure 11:
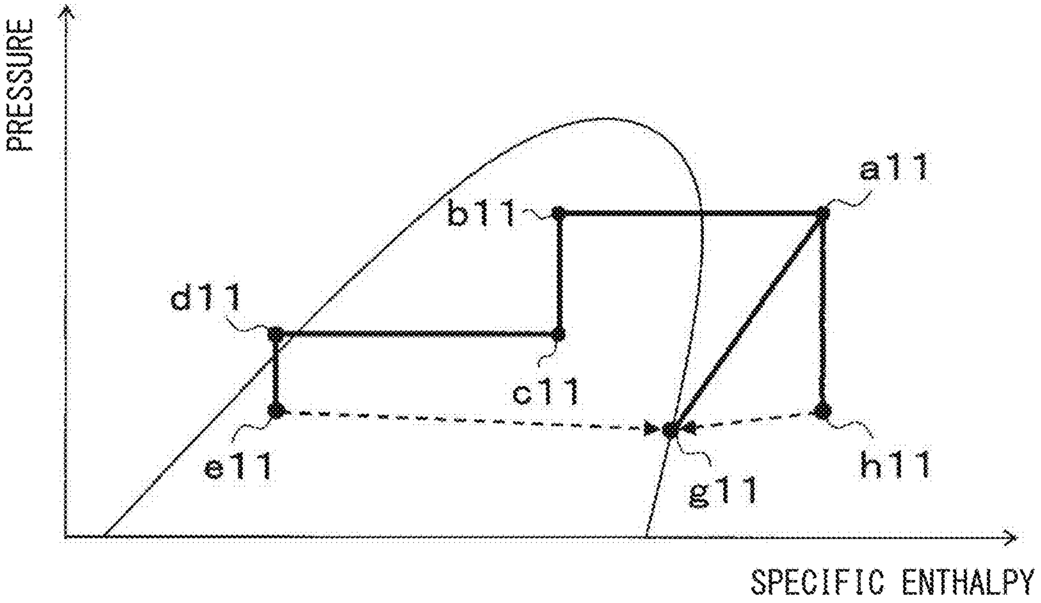
FIG. 11 is a Mollier diagram illustrating a state of a refrigerant during a heating hot gas defrosting mode of the heat pump cycle of the embodiment.

Therefore, in the heat pump cycle 10 of the heating hot gas defrosting mode, the state of the refrigerant changes as illustrated in a Mollier diagram of FIG. 11.

That is, the flow of the discharge refrigerant (point a11 in FIG. 11) discharged from the compressor 11 is branched at first three-way joint 12*a*. One refrigerant branched at the first three-way joint 12*a* flows into the interior condenser 13. The refrigerant having flowed into the interior condenser 13 exchanges heat with the ventilation air in accordance with the opening degree of the air mix door 54 to radiate heat and condense (from point a11 to point b11 in FIG. 11). Thus, the ventilation air is heated.

The refrigerant flowing out of the interior condenser 13 is decompressed by the heating expansion valve 14*a* (from point b11 to point c11 in FIG. 11). Thus, the outside air side refrigerant pressure P2 approaches the reference defrosting pressure KPdf. That is, the temperature of the refrigerant flowing into the outside air heat exchanger 15 approaches the reference defrosting temperature KTdf.

The refrigerant decompressed by the heating expansion valve 14*a* flows into the outside air heat exchanger 15. The refrigerant having flowed into the outside air heat exchanger 15 radiates heat to frost adhering to the outside air heat exchanger 15 and condenses when flowing through the outside air heat exchanger 15 (from point c11 to point d11 in FIG. 11). Thus, the frost adhering to the outside air heat exchanger 15 is melted, and defrosting of the outside air heat exchanger 15 is implemented. Subsequent operations of the heat pump cycle 10 are similar to those in the sole hot gas defrosting mode.

In the interior air conditioning unit 50 in the heating hot gas defrosting mode, as in the sole outside air endothermic heating mode, the ventilation air whose temperature has been adjusted is blown into the vehicle interior, thereby implementing heating of the vehicle interior.

As described above, in the vehicle air conditioner 1 of the present embodiment, the defrosting of the outside air heat exchanger 15 can be quickly and efficiently completed by switching the defrosting modes.

More specifically, in the (e-2) endothermic hot gas defrosting mode and the (e-3) hot gas defrosting mode of the present embodiment, the refrigerant decompressed in the cool-down expansion valve 14*c* and the refrigerant flowing out of the bypass-side flow rate adjusting valve 14*d* are mixed and sucked into the compressor 11. That is, the refrigerant having a relatively high enthalpy is mixed with the refrigerant decompressed by the cool-down expansion valve 14*c* to balance the cycle.

Thus, in the (e-2) endothermic hot gas defrosting mode and the (e-3) hot gas defrosting mode, the refrigerant on the outlet side of the outside air heat exchanger 15 can be changed to a refrigerant having a relatively low enthalpy, and the amount of heat released from the refrigerant in the outside air heat exchanger 15 can be increased. For example, in the (e-3-1) sole hot gas defrosting mode, the amount of heat dissipation can be increased as indicated by point c10 to point d10 in FIG. 10.

As a result, the amount of heat released from the refrigerant flowing through the outside air heat exchanger 15 to the frost adhering to the outside air heat exchanger 15 is increased, and the defrosting of the outside air heat exchanger 15 can be quickly completed.

In the hot gas defrosting mode (e-3), the target low pressure PSO3 for hot gas defrosting is set to a pressure higher than the target low pressure PSO2 for endothermic hot gas defrosting. Therefore, the refrigerant having high density can be sucked into the compressor 11. The discharge flow rate Gr of the compressor 11 at the same rotation speed can be increased.

As a result, in the hot gas defrosting mode (e-3), the defrosting of the outside air heat exchanger 15 can be quickly completed without using defrosting heat generated by the battery 70. That is, it is possible to quickly complete the defrosting of the outside air heat exchanger 15 without requiring a heat absorption source for generating the defrosting heat.

In the defrosting mode of the present embodiment, as described in steps S2 and S3 of FIG. 4, when the refrigerant is able to absorb the defrosting heat generated by the battery 70 in the chiller 20, the refrigerant is made to absorb the defrosting heat in the chiller 20.

Therefore, in the (e-2) endothermic hot gas defrosting mode, the defrosting of the outside air heat exchanger 15 can be completed quickly even if the compressor 11 reduces the compression workload more than in the (e-3) hot gas defrosting mode. As a result, in the (e-2) endothermic hot gas defrosting mode, the defrosting of the outside air heat exchanger 15 can be completed more efficiently and more quickly than in the (e-3) hot gas defrosting mode.

In the defrosting mode of the present embodiment, as described in step S2 of FIG. 4, when the refrigerant is able to absorb sufficient defrosting heat in the chiller 20, the mode can be switched to the (e-1) endothermic defrosting mode. In the (e-1) endothermic defrosting mode, the condensation heat defrosting of the outside air heat exchanger 15 can be performed using the compression work and the defrosting heat of the compressor 11.

Therefore, in the (e-1) endothermic defrosting mode, the defrosting of the outside air heat exchanger 15 can be completed more efficiently and more quickly than in the (e-2) endothermic hot gas defrosting mode and the (e-3) hot gas defrosting mode.

In the defrosting mode of the present embodiment, as described in steps S2 and S3 of FIG. 4, whether the refrigerant is able to absorb the defrosting heat in the chiller 20 is determined using the low-temperature side heat medium temperature TWL. In this manner, it is possible to easily determine whether the refrigerant is able to absorb the defrosting heat in the chiller 20.

The vehicle air conditioner 1 of the present embodiment includes the heating expansion valve 14*a* as the upstream decompression unit. Therefore, during the defrosting mode, the refrigerant decompressed by the heating expansion valve 14*a* can flow into the outside air heat exchanger 15 to dissipate heat. In this manner, the temperature of the refrigerant flowing into the outside air heat exchanger 15 can be adjusted after stabilizing the operating state of the compressor 11 without excessively decreasing the rotation speed of the compressor 11.

In the defrosting mode of the present embodiment, the throttle opening degree or the like of the heating expansion valve 14*a* is controlled so that the temperature of the refrigerant flowing into the outside air heat exchanger 15 approaches the reference defrosting temperature KTdf. In this manner, the defrosting of the outside air heat exchanger 15 can be quickly completed without unnecessarily increasing the pressure of the refrigerant flowing into the outside air heat exchanger 15.

The vehicle air conditioner 1 of the present embodiment includes the interior condenser 13 as a heating unit. Therefore, as described in (e-1-2) heating endothermic defrosting mode, (e-2-2) heating endothermic hot gas defrosting mode, and (e-3-2) heating hot gas defrosting mode, heating of the vehicle interior can be implemented simultaneously with defrosting of the outside air heat exchanger 15.

The present disclosure is not limited to the above-described embodiment, and can be variously modified as follows without departing from the gist of the present disclosure.

In the above-described embodiment, the example in which the heat pump cycle apparatus according to the present disclosure is applied to the vehicle air conditioner has been described, but the application target of the heat pump cycle apparatus is not limited to the vehicle air conditioner. For example, the heat pump cycle apparatus may be applied to an air conditioner that performs only air conditioning of a space to be air conditioned without performing temperature adjustment of a heat generating device. For example, the present invention may be applied to a water heater that heats domestic water or the like as a heating target.

In the above embodiment, the example in which the battery 70 is a heat absorption source that generates defrosting heat has been described, but the heat absorption source is not limited to the battery 70. For example, the temperature of an inverter, a PCU, a transaxle, a control device for an ADAS, or the like may be adjusted. Further, the temperatures of the plurality of in-vehicle devices may be adjusted.

The inverter supplies power to a motor generator or the like. The PCU is a power control unit that performs transformation and power distribution. The transaxle is a power transmission mechanism in which a transmission, a differential gear, and the like are integrated. The control device for the ADAS is a control device for an advanced driver assistance system.

In the heat pump cycle apparatus according to the present disclosure, when only the (e-3) hot gas defrosting mode is executed as the defrosting mode without switching the operation mode, the heat pump cycle apparatus need not include the heat absorption source.

The configuration of the heat pump cycle apparatus according to the present disclosure is not limited to the configuration disclosed in the above-described embodiment.

In the above-described embodiment, the example in which the interior condenser 13 is employed as the heating unit has been described, but the heating unit is not limited to the interior condenser 13. For example, a heating unit in which a high-temperature side pump, a water refrigerant heat exchanger, a heater core, and the like are disposed in a high-temperature side heat medium circulation circuit for circulating the high-temperature side heat medium may be employed as the heating unit.

The high-temperature side pump is a pump that pressure-feeds the high-temperature side heat medium to the water passage of the water refrigerant heat exchanger. It is sufficient if a basic configuration of the high-temperature side pump is similar to that of the low-temperature side pump 41. As the high-temperature side heat medium, the same kind of fluid as the low-temperature side heat medium can be employed. The water refrigerant heat exchanger exchanges heat between the high-pressure refrigerant discharged from the compressor 11 and the high-temperature side heating medium pressure-fed from the high-temperature side pump. The heater core is a heating heat exchanger that exchanges heat between the high-temperature side heating medium heated by the water refrigerant heat exchanger and the ventilation air.

The heater core is disposed in the air passage of the interior air conditioning unit 50 in a manner similar to that of the interior condenser 13. Thus, the ventilation air as a heating target can be indirectly heated through the high-temperature side heat medium using the discharged refrigerant as a heat source during the outside air endothermic heating mode or the like.

In the high-temperature side heat medium circulation circuit, the amount of heat exchange between the refrigerant and the high-temperature side heat medium in the water refrigerant heat exchanger can be changed by changing the rotation speed of the high-temperature side pump.

Therefore, the high-temperature side pump serves as an operation mode switching unit that switches the operation mode by changing the amount of heat exchange between the refrigerant and the high-temperature side heat medium in the water refrigerant heat exchanger. More specifically, the high-temperature side pump serves as an operation mode switching unit that switches the operation mode by switching whether the refrigerant and the high-temperature side heat medium are subjected to heat exchange in the water refrigerant heat exchanger.

In the above embodiment, the example in which the accumulator 23 is employed as a gas-liquid separator that stores a surplus liquid-phase refrigerant in the heat pump cycle 10 has been described. However, a receiver may be employed instead of the accumulator 23. The receiver is a gas-liquid separator on the high-pressure side that separates the refrigerant flowing out of the interior condenser 13 into gas and liquid and stores the surplus liquid-phase refrigerant in the cycle.

In a case where the receiver is employed instead of the accumulator 23, the control device 60 only needs to control the throttle opening of the cool-down expansion valve 14*c* so that the superheating degree SHC becomes a predetermined reference superheating degree KSH during the (c) outside air endothermic heating mode or the like.

In the above embodiment, the example in which the second check valve 16*b* is employed has been described, but an evaporating pressure regulating valve may be employed instead of the second check valve 16*b*. The evaporating pressure regulating valve is a variable throttle mechanism that maintains a refrigerant evaporating temperature at the interior evaporator 18 at a predetermined temperature or higher. It is sufficient if a temperature at which the interior evaporator 18 can be suppressed is employed as the predetermined temperature.

As the evaporating pressure regulating valve, a variable throttle mechanism including a mechanical mechanism that increases a valve opening degree as the pressure of the refrigerant on the refrigerant outlet side of the interior evaporator 18 increases may be employed. As the evaporating pressure regulating valve, a variable throttle mechanism constituted by an electric mechanism similar to that of the heating expansion valve 14*a* or the like may be employed.

In the above embodiment, the example in which the sixth three-way joint 12*f*, which is the bypass-side merging part, is disposed on the refrigerant flow upstream side of the chiller 20 has been described, but the present embodiment is not limited thereto.

For example, the sixth three-way joint 12*f* may be disposed on the downstream side of the chiller 20 in the refrigerant flow. In this case, the refrigerant flowing out of the bypass-side flow rate adjusting valve 14*d* and the refrigerant flowing out of the refrigerant passage of the chiller 20 are homogeneously mixed when flowing through the refrigerant pipe from the accumulator 23 or the sixth three-way joint 12*f* to the suction side of the compressor 11.

For example, the sixth three-way joint 12*f* may be eliminated, and an end of the bypass passage 21*a* may be directly connected to the accumulator 23. Further, a mixing unit that homogeneously mixes the refrigerant decompressed in the cool-down expansion valve 14*c* and the refrigerant flowing out of the bypass-side flow rate adjusting valve 14*d* may be provided.

In the above-described embodiment, in the (e-1-1) sole endothermic defrosting mode, the interior blower 52 is stopped and the air passage on the interior condenser 13 side is closed by the air mix door 54 in order not to heat the ventilation air in the interior condenser 13 as the heating unit, but the present embodiment is not limited to this.

For example, a heating unit bypass passage may be added that bypasses the heating unit and guides the refrigerant flowing out of the first three-way joint 12 toward the inflow port side of the second three-way joint 12. During the (e-1-1) sole endothermic defrosting mode, the refrigerant flowing out of the first three-way joint 12 may flow into the heating unit bypass passage. The same applies to the (e-2-1) sole endothermic hot gas defrosting mode and the (e-3-1) sole hot gas defrosting mode.

In the above embodiment, the example in which R1234yf is employed as the refrigerant of the heat pump cycle 10 has been described, but the present embodiment is not limited thereto. For example, R134a, R600a, R410A, R404A, R32, R407C, and the like may be employed. Alternatively, a mixed refrigerant obtained by mixing a plurality of kinds of these refrigerants or the like may be employed. Further, carbon dioxide may be employed as the refrigerant to form a supercritical refrigeration cycle in which the high-pressure side refrigerant pressure is equal to or higher than the critical pressure of the refrigerant.

In the above embodiment, the example in which PAG oil (that is, polyalkylene glycol oil) is employed as the refrigerating machine oil has been described, but the present embodiment is not limited thereto. For example, POE (that is, polyol ester) or the like may be employed.

In the above embodiment, the example in which an ethylene glycol aqueous solution is employed as the heat medium and the low-temperature side heat medium has been described, but the present embodiment is not limited thereto. For example, dimethylpolysiloxane, a solution containing a nanofluid or the like, an antifreeze liquid, an aqueous liquid refrigerant containing alcohol or the like, a liquid medium containing oil or the like may be employed.

The sensor group for control connected to the input side of the control device 60 is not limited to the detection unit disclosed in the above-described embodiment. Various detection units may be added, as necessary.

The control mode of the heat pump cycle apparatus according to the present disclosure is not limited to the control mode disclosed in the above-described embodiment.

In the above-described embodiment, the vehicle air conditioner 1 capable of executing various operation modes has been described. However, the heat pump cycle apparatus according to the present disclosure is not necessarily capable of executing all the above-described operation modes.

If at least the (e-3) hot gas defrosting mode can be executed, it is possible to obtain an effect of quickly completing the defrosting of the outside air heat exchanger 15 without requiring a heat absorption source. If at least the (e-2) endothermic hot gas defrosting mode can be executed, an effect of efficiently and quickly completing the defrosting of the outside air heat exchanger 15 can be obtained.

The vehicle air conditioner 1 may be capable of executing other operation modes. For example, in a case of including the evaporating pressure regulating valve, a parallel dehumidifying heating mode may be executable.

In the heat pump cycle 10 of the parallel dehumidifying heating mode, the refrigerant discharged from the compressor 11 circulates through the interior condenser 13, the heating expansion valve 14*a* in the throttling state, the outside air heat exchanger 15, the low-pressure side passage 21*c*, the accumulator 23, and the suction port of the compressor 11 in this order. At the same time, it is sufficient if the refrigerant discharged from the compressor 11 is switched to a refrigerant circuit that circulates through the interior condenser 13, the high-pressure side passage 21*b*, the cooling expansion valve 14*b* in the throttling state, the interior evaporator 18, the accumulator 23, and the suction port of the compressor 11 in this order. That is, it is sufficient if the interior evaporator 18 and the outside air heat exchanger 15 are switched to a refrigerant circuit connected in parallel to the flow of the refrigerant.

In the parallel dehumidifying heating mode, it is sufficient if the control device 60 appropriately controls the operation of other control target devices as in (b) the dehumidifying heating mode.

In the parallel dehumidifying heating mode, the ventilation air cooled down and dehumidified in the interior evaporator 18 is reheated in the interior condenser 13 and blown into the vehicle interior. Thus, dehumidification and heating of the vehicle interior can be implemented. In the parallel dehumidifying heating mode, the refrigerant decompressed by the heating expansion valve 14*a* flows into the outside air heat exchanger 15, and the refrigerant absorbs heat of the outside air in the outside air heat exchanger 15. Therefore, the parallel dehumidifying heating mode is included in the heating mode of heating the heating target.

In the above-described (d) hot gas heating mode and the like, an example has been described in which the throttle opening of the cool-down expansion valve 14*c* is controlled so that the refrigerant on the outlet side of the chiller 20 approaches the saturated gas-phase refrigerant, but the present embodiment is not limited thereto.

For example, the throttle opening of the cool-down expansion valve 14*c* or the like may be controlled so that the refrigerant on the outlet side of the chiller 20 approaches a gas-liquid two-phase refrigerant appropriately containing a liquid-phase refrigerant in which a refrigerating machine oil is dissolved. That is, the throttle opening of the cool-down expansion valve 14*c* or the like may be controlled so that the degree of dryness Rxc of the refrigerant on the outlet side of the chiller 20 becomes a relatively high value.

In the (e-2) endothermic hot gas defrosting mode, the (e-3) hot gas defrosting mode, and the like of the above-described embodiment, an example has been described in which the throttle opening of the heating expansion valve 14*a* is controlled so that the outside air side refrigerant pressure P2 approaches the reference defrosting pressure KPdf, but the present embodiment is not limited thereto.

For example, the throttle opening of the cool-down expansion valve 14*c* may be controlled so that the outside air side refrigerant pressure P2 approaches the reference defrosting pressure KPdf, and the throttle opening of the heating expansion valve 14*a* may be controlled so that the refrigerant on the outlet side of the chiller 20 approaches the saturated gas-phase refrigerant. For example, the opening ratio of the throttle opening of the heating expansion valve 14*a* to the throttle opening of the cool-down expansion valve 14*c* may be controlled so that the outside air side refrigerant pressure P2 approaches the reference defrosting pressure KPdf and the refrigerant on the outlet side of the chiller 20 approaches the saturated gas-phase refrigerant.

That is, it is sufficient if the control device 60 controls the operation of at least one of the heating expansion valve 14*a* or the cool-down expansion valve 14*c* so that the temperature of the refrigerant flowing into the outside air heat exchanger 15 approaches the reference defrosting temperature KTdf.

In the above embodiment, an example has been described in which, when the heating switch of the operation panel 69 is turned on during the defrosting mode, the vehicle interior is heated together with the defrosting of the outside air heat exchanger 15. However, the present embodiment is not limited to this. For example, when the outside air temperature Tam is equal to or lower than a predetermined reference heating temperature, the vehicle interior may be heated together with defrosting of the outside air heat exchanger 15.

The frost formation condition and the end condition that can be employed in the control flow of FIG. 4 are not limited to the conditions disclosed in the above embodiment. For example, the frost formation condition may be a condition that is established when the time during which the outside air temperature Tam is equal to or lower than a predetermined frost formation determination outside air temperature KTamf becomes equal to or longer than a predetermined reference time. For example, the end condition may be a condition that is satisfied when the defrosting elapsed time from the start of the operation in the defrosting mode becomes equal to or longer than a predetermined reference defrosting time.

The refrigerant cycle apparatus according to the present disclosure includes the following items or/and features.

(Item 1)

A heat pump cycle apparatus includes: a compressor (11) configured to compress and discharge a refrigerant; an upstream branch part (12*a*) configured to branch a flow of the refrigerant discharged from the compressor; a heating unit (13) that heats a heating target using the refrigerant flowing out of one outflow port of the upstream branch part as a heat source; an outside air heat exchanger (15) in which heat is exchanged between the refrigerant and outside air; an upstream decompression unit (14*a*) configured to decompress the refrigerant flowing into the outside air heat exchanger; a downstream decompression unit (14*c*) configured to decompress the refrigerant flowing out of the outside air heat exchanger; a bypass passage (21*a*) through which the refrigerant flowing out of an another outflow port of the upstream branch part flows toward a suction port side of the compressor; and a bypass-side flow rate adjusting unit (14*d*) configured to adjust a flow rate of the refrigerant flowing through the bypass passage. In a heating mode in which the heating target is heated by the heating unit, the refrigerant decompressed in the upstream decompression unit is caused to flow into the outside air heat exchanger and to absorb heat of the outside air in the outside air heat exchanger. In addition, in a defrosting mode in which frost adhering to the outside air heat exchanger is removed, the refrigerant flowing out of the one outflow port of the upstream branch part is caused to flow into the outside air heat exchanger to dissipate heat, the refrigerant flowing out of the outside air heat exchanger is decompressed by the downstream decompression unit, and the refrigerant decompressed by the downstream decompression unit and the refrigerant flowing out of the bypass-side flow rate adjusting unit are mixed and sucked into the compressor.

(Item 2)

In the heat pump cycle apparatus according to Item 1, during the defrosting mode, the refrigerant flowing out of the one outflow port of the upstream branch part is decompressed by the upstream decompression unit, and the refrigerant flowing out of the upstream decompression unit is caused to flow into the outside air heat exchanger to dissipate heat.

(Item 3)

In the heat pump cycle apparatus according to Item 1 or 2, during the defrosting mode, the refrigerant flowing out of the one outflow port of the upstream branch part is caused to flow into the heating unit to heat the heating target, the refrigerant flowing out of the heating unit is decompressed by the upstream decompression unit, and the refrigerant flowing out of the upstream decompression unit is caused to flow into the outside air heat exchanger to dissipate heat.

(Item 4)

In the heat pump cycle apparatus according to Item 2 or 3, during the defrosting mode, operation of at least one of the upstream decompression unit or the downstream decompression unit is controlled such that a temperature of the refrigerant flowing into the outside air heat exchanger approaches a predetermined reference defrosting temperature (KTdf).

(Item 5)

The heat pump cycle apparatus according to any one of Items 1 to 4 further includes a defrosting heat absorbing unit (20) configured to cause the refrigerant to absorb a defrosting heat used for defrosting the outside air heat exchanger. In this case, the defrosting heat is absorbed by the refrigerant in the defrosting heat absorbing unit during the defrosting mode and when the refrigerant is made to absorb the defrosting heat in the defrosting heat absorbing unit.

Although the present disclosure has been described in accordance with examples, it is understood that the present disclosure is not limited to the examples and structures. The present disclosure also encompasses various modifications and variations within the scope of equivalents. In addition, various combinations and modes, and other combinations and modes including only one element, more elements, or less elements are also within the scope and idea of the present disclosure.

What is claimed is:

1. A heat pump cycle apparatus comprising:

a compressor configured to compress and discharge a refrigerant;

an upstream branch part configured to branch a flow of the refrigerant discharged from the compressor;

a heating unit that heats a heating target using the refrigerant flowing out of one outflow port of the upstream branch part as a heat source;

an outside air heat exchanger in which heat is exchanged between the refrigerant and outside air;

an upstream decompression unit configured to decompress the refrigerant flowing into the outside air heat exchanger;

a downstream decompression unit configured to decompress the refrigerant flowing out of the outside air heat exchanger;

a bypass passage through which the refrigerant flowing out of an another outflow port of the upstream branch part flows toward a suction port side of the compressor; and a bypass-side flow rate adjusting unit configured to adjust a flow rate of the refrigerant flowing through the bypass passage, wherein in a heating mode in which the heating target is heated by the heating unit, the refrigerant decompressed in the upstream decompression unit is caused to flow into the outside air heat exchanger and to absorb heat of the outside air in the outside air heat exchanger, and in a defrosting mode in which frost adhering to the outside air heat exchanger is removed, the refrigerant flowing out of the one outflow port of the upstream branch part is caused to flow into the outside air heat exchanger to dissipate heat, the refrigerant flowing out of the outside air heat exchanger is decompressed by the downstream decompression unit, and the refrigerant decompressed by the downstream decompression unit and the refrigerant flowing out of the bypass-side flow rate adjusting unit are mixed and sucked into the compressor.

2. The heat pump cycle apparatus according to claim 1, wherein in the defrosting mode, the refrigerant flowing out of the one outflow port of the upstream branch part is decompressed by the upstream decompression unit, and the refrigerant flowing out of the upstream decompression unit is caused to flow into the outside air heat exchanger to dissipate heat.

3. The heat pump cycle apparatus according to claim 1, wherein in the defrosting mode, the refrigerant flowing out of the one outflow port of the upstream branch part is caused to flow into the heating unit to heat the heating target, the refrigerant flowing out of the heating unit is decompressed by the upstream decompression unit, and the refrigerant flowing out of the upstream decompression unit is caused to flow into the outside air heat exchanger to dissipate heat.

4. The heat pump cycle apparatus according to claim 2, wherein in the defrosting mode, operation of at least one of the upstream decompression unit or the downstream decompression unit is controlled such that a temperature of the refrigerant flowing into the outside air heat exchanger approaches a predetermined reference defrosting temperature.

5. The heat pump cycle apparatus according to claim 1, comprising:

a defrosting heat absorbing unit configured to cause the refrigerant to absorb a defrosting heat used for defrosting the outside air heat exchanger, wherein the defrosting heat is absorbed by the refrigerant in the defrosting heat absorbing unit during the defrosting mode and when the refrigerant is made to absorb the defrosting heat in the defrosting heat absorbing unit.

6. A heat pump cycle apparatus comprising:

a compressor configured to compress and discharge a refrigerant;

an upstream branch joint configured to branch a flow of the refrigerant discharged from the compressor;

a heater that heats a heating target using the refrigerant flowing out of one outflow port of the upstream branch joint as a heat source;

an outside air heat exchanger in which heat is exchanged between the refrigerant and outside air;

an upstream decompression valve configured to decompress the refrigerant flowing into the outside air heat exchanger;

a downstream decompression valve configured to decompress the refrigerant flowing out of the outside air heat exchanger;

a bypass passage through which the refrigerant flowing out of an another outflow port of the upstream branch joint flows toward a suction port side of the compressor;

a bypass passage valve configured to adjust a flow rate of the refrigerant flowing through the bypass passage; and a controller including at least one of a circuit and a processor having a memory storing computer program code, wherein the controller is configured to control the upstream decompression valve, the downstream decompression valve and the bypass passage valve, and to set (i) a heating mode in which the heating target is heated by the heater, the refrigerant decompressed by the upstream decompression valve is caused to flow into the outside air heat exchanger and to absorb heat of the outside air in the outside air heat exchanger, and (ii) a defrosting mode in which frost adhering to the outside air heat exchanger is removed, the refrigerant flowing out of the one outflow port of the upstream branch joint is caused to flow into the outside air heat exchanger to dissipate heat, the refrigerant flowing out of the outside air heat exchanger is decompressed by the downstream decompression valve, and the refrigerant decompressed by the downstream decompression valve and the refrigerant flowing out of the bypass passage valve are mixed and sucked into the compressor.

7. The heat pump cycle apparatus according to claim 6, wherein the controller is configured to set the defrosting mode in which the refrigerant flowing out of the one outflow port of the upstream branch joint is decompressed by the upstream decompression valve, and the refrigerant flowing out of the upstream decompression valve is caused to flow into the outside air heat exchanger to dissipate heat, and the controller is configured to control operation of at least one of the upstream decompression valve or the downstream decompression valve, and to cause a temperature of the refrigerant flowing into the outside air heat exchanger to become a predetermined reference defrosting temperature, in the defrosting mode.

* * * * *